US008547903B2

(12) United States Patent
Lee et al.

(10) Patent No.: US 8,547,903 B2
(45) Date of Patent: Oct. 1, 2013

(54) RANGING STRUCTURE, MULTIPLEXING METHOD AND SIGNALING METHOD FOR LEGACY SUPPORT MODE

(75) Inventors: Hyun Woo Lee, Gyeonggi-do (KR); Min Seok Noh, Seoul (KR); Yeong Hyeon Kwon, Daejeon-si (KR); Jin Sam Kwak, Gyeonggi-do (KR); Dong Cheol Kim, Gyeonggi-do (KR); Sung Ho Moon, Gyeonggi-do (KR); Seung Hee Han, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 297 days.

(21) Appl. No.: 12/921,307

(22) PCT Filed: Mar. 4, 2009

(86) PCT No.: PCT/KR2009/001060
§ 371 (c)(1),
(2), (4) Date: Oct. 1, 2010

(87) PCT Pub. No.: WO2009/110744
PCT Pub. Date: Sep. 11, 2009

(65) Prior Publication Data
US 2011/0019622 A1 Jan. 27, 2011

Related U.S. Application Data

(60) Provisional application No. 61/033,431, filed on Mar. 4, 2008, provisional application No. 61/042,277, filed on Apr. 4, 2008.

(30) Foreign Application Priority Data

Aug. 28, 2008 (KR) .......................... 10-2008-0084448
Feb. 26, 2009 (KR) .......................... 10-2009-0016270

(51) Int. Cl.
*H04W 4/00* (2009.01)

(52) U.S. Cl.
USPC .......................................... 370/328

(58) Field of Classification Search
USPC ......... 370/203, 204–215, 229–240, 310–337, 370/338–350, 351–394, 395.1, 395.3, 395.4, 370/395.41, 395.42, 395.5, 395.52, 395.53, 370/412–421, 431–457, 458–463, 464–497, 370/498–529
See application file for complete search history.

(56) References Cited

U.S. PATENT DOCUMENTS

| | | | |
|---|---|---|---|
| 2005/0030931 A1* | 2/2005 | Sung et al. ..................... | 370/342 |
| 2006/0146861 A1 | 7/2006 | Maeda | |
| 2007/0010237 A1 | 1/2007 | Jones et al. | |
| 2008/0170632 A1* | 7/2008 | Sohn et al. ..................... | 375/260 |
| 2009/0067377 A1* | 3/2009 | Talukdar et al. ............. | 370/329 |
| 2009/0161616 A1* | 6/2009 | Ramesh et al. ............... | 370/329 |

* cited by examiner

*Primary Examiner* — Jung-Jen Liu
(74) *Attorney, Agent, or Firm* — Birch, Stewart, Kolasch & Birch, LLP

(57) ABSTRACT

A method of performing communication in a wireless communication system is disclosed. In performing ranging, which is performed by a terminal in a wireless communication system supporting a normal scheme and a legacy scheme, the present invention includes selecting a specific ranging structure from a first ranging structure supporting the normal scheme and a second ranging structure supporting the legacy scheme, and transmitting a ranging signal using the specific ranging structure, wherein the first ranging structure and the second ranging structure are set to differ in at least one of a time resource, a frequency resource and a code resource.

11 Claims, 37 Drawing Sheets

(a) Time Division Multiplexing (b) Frequency Division Multiplexing (a) Initial ranging or HO ranging transmission for OFDMA (b) Initial ranging or HO ranging transmission for OFDMA, using two consecutive initial ranging or Ho ranging codes (a) Periodic ranging or BR transmission for OFDMA using 1 code (b) Periodic ranging or BR transmission for OFDMA using 3 consecutive codes PRBS generator for ranging code generation (a) 2-symbol ranging structure (b) 4-symbol ranging structure (a) Distinguished by codes (b) Distinguished by time/ frequency resources (c) Distinguished by time/ frequency resources and codes (a) Using the remaining codes (b) Using subgroup codes (c) Using the remaining codes and subgroup codes (a) 16e codes (b) 16m codes (a) Auto-correlation properties (b) Cross-correlation properties (c) Cross-correlation property between two example codes (a) 16e codes (b) 16m codes (a) Cross-correlation property between 400 example codes (b) Cross-correlation property between two example codes Seeds : [0 0 1 0 1 0 1 1 0 0 0 0 0 0 0] & [0 0 1 0 1 0 1 1 0 0 0 0 0 0 1]

(a) Cross-correlation property between 400 example codes (b) Cross-correlation property between two example codes
Seeds : [0 0 1 0 1 0 1 1 0 0 0 0 0 0 0] & [0 0 1 0 1 0 1 1 0 1 0 0 0 0 0]

(a) Cross-correlation property between 400 example codes (b) Cross-correlation property between two example codes
Seeds : [0 0 1 0 1 0 1 1 0 0 0 0 0 0 0] & [1 0 1 0 1 0 1 1 0 0 0 0 0 0 0]

(a) 16e codes (b) 16m codes (a) Cross-correlation property between 400 example codes (b) Cross-correlation property between two example codes
Phase shift: $\theta = -2\pi k l / N$ where N=32767, k: 0~(N-1), l=10

(a) Cross-correlation property between 400 example codes (b) Cross-correlation property between two example codes
Phase shift: $\theta = -2\pi k l / N$ where N=32767, k: 0~(N-1), l=50

(a) Cross-correlation property between 400 example codes (b) Cross-correlation property between two example codes Phase shift : $\theta = -2\pi\, kl / N$ where N=32767, k: 0~(N-1), l=150

(a) Cross-correlation property between 400 example codes (b) Cross-correlation property between two example codes Phase shift: $\theta = -2\pi kl/N$ where N=144, k: 0~(32767-1), l=10

(a) Cross-correlation property between 400 example codes (b) Cross-correlation property between two example codes Phase shift: $\theta = -2\pi k l / N$ where N=144, k: 0~(32767-1), l=50

(a) Cross-correlation property between 400 example codes (b) Cross-correlation property between two example codes Phase shift: $\theta = -2\pi k l / N$ where N=144, k: 0~(32767-1), l=150

(a) Cross-correlation property between 400 example codes (b) Cross-correlation property between two example codes Phase shift : $\theta = -2\pi k l / N$ where N=144, k: 0~(144-1), l=10

(a) Cross-correlation property between 400 example codes (b) Cross-correlation property between two example codes Phase shift : $\theta = -2\pi k l / N$ where N=144, k: 0~(144-1). l=50

(a) Cross-correlation property between 400 example codes (b) Cross-correlation property between two example codes Phase shift: $\theta = -2\pi k l / N$ where N=144, k: 0~(144-1), l=150

(a) Cross-correlation property between 400 example codes (b) Cross-correlation property between two example codes Polynomials : [ $1 + x^1 + x^4 + x^7 + x^{15}$ ] & [ $1 + x^8 + x^{11} + x^{14} + x^{15}$ ]

○ 16m ranging uses a frequency / time resource which is
allocated at the relatively same position as that of 16e ranging (a)

(b)

(a)

(b)

RANGING STRUCTURE, MULTIPLEXING METHOD AND SIGNALING METHOD FOR LEGACY SUPPORT MODE

This application claims the benefit of U.S. provisional application 61/033,431, filed on Mar. 4, 2008, U.S. provisional application 61/042,277, filed on Apr. 4, 2008, Korean Patent Application No. 10-2008-0084448, filed on Aug. 28, 2008, and Korean Patent Application No. 10-2009-0016270, filed on Feb. 26, 2009, which are hereby incorporated by reference as if fully set forth herein.

BACKGROUND OF THE INVENTION

1. Field of the Invention

The present invention relates to a method of performing communication in a wireless communication system, and more particularly, to a ranging structure for supporting a legacy support mode and multiplexing method thereof. Although the present invention is suitable for a wide scope of applications, it is particularly suitable for using IEEE 802.16e ranging structure and IEEE 802.16m ranging structure together.

2. Discussion of the Related Art

A network entry procedure when a terminal is initiated in a broadband wireless access system will be described below.

(1) If a terminal is initially powered on, the terminal retrieves downlink channels and acquires uplink/downlink synchronization with a base station. At this time, the terminal receives a downlink-map (DL-MAP) message, an uplink-map (UL-MAP) message, a downlink channel descriptor (DCD) message, and an uplink channel descriptor (UCD) message to acquire uplink and downlink channel parameters.

(2) The terminal performs ranging with the base station to adjust uplink transmission parameters, and is allocated with basic management connection identifier (CID) and primary management CID from the base station.

(3) The terminal performs basic capability negotiation with the base station.

(4) The terminal performs its authentication procedure.

(5) The terminal is subscribed to the base station, and the terminal managed by IP is allocated with secondary management CID from the base station.

(6) The terminal sets IP connection.

(7) The terminal sets the current date and time.

(8) The terminal downloads its configuration file from a TFTP server.

(9) The terminal sets connection of a service which is previously prepared.

FIG. 1 is a flow chart illustrating the aforementioned procedure.

A physical layer of a broadband wireless access system is divided into a single carrier scheme and a multiple carrier scheme (OFDM/OFDMA). The multiple carrier scheme uses OFDM, and introduces an OFDMA (Orthogonal Frequency Division Multiple Access) scheme as an access scheme that can allocate resources in a unit of sub-channel by grouping a part of carriers.

A physical layer of the OFDMA scheme divides active carriers into a plurality of groups and transmits the respective groups to different receiving sides. In this way, a group of carriers transmitted to one receiving side is referred to as a sub-channel. Carriers constituting each sub-channel may be located to be adjacent to each other or may be spaced apart from each other at constant intervals. Such a multiple access in a unit of sub-channel may increase complexity but is advantageous in that frequency diversity gain and gain subject to concentration of power can be obtained, and forward power control can efficiently be performed.

A slot allocated to each user is defined by a data region of a two-dimensional time-frequency sphere, and is a set of continuous sub-channels allocated by burst. One data region in the OFDMA scheme is a rectangular form sectioned by time and sub-channel coordinates. Such a data region can be allocated to an uplink for a specific user, or a base station can transmit the data region to a specific user in a downlink. In order to define such a data region on the two-dimensional sphere, the number of OFDM symbols in the time domain and the number of continuous sub-channels starting from a point having an offset from a reference point in the frequency domain should be given.

FIG. 2 illustrates a frame structure of a physical layer of an OFDMA scheme in a broadband wireless access system. A downlink sub-frame starts with a preamble used for synchronization and equalization in a physical layer, and a structure of the entire frame is defined through a broadcast type downlink-map (DL-MAP) message and uplink-map (UL-MAP) message which define location and usage of burst allocated to a downlink and an uplink.

The downlink map (DL-MAP) message defines usage allocated per burst for a downlink interval in a burst mode physical layer while the uplink map (UL-MAP) message defines usage of the burst allocated for an uplink interval. An information element constituting the DL-MAP message divides a downlink traffic interval in a user terminal through downlink interval usage code (DIUC) and location information of burst (sub-channel offset, symbol offset, the number of sub-channels, and the number of symbols). Meanwhile, usage of an information element constituting the UL-MAP message is defined by uplink interval usage code (UIUC) per connection ID (CID), and location of a corresponding interval is defined by 'duration.' Usage per interval is defined in accordance with the UIUC value used in the UL-MAP, and each interval starts from a point away from a start point of a previous information element (IE) by 'duration' defined in the UL-MAP information element (IE).

The main standard defined by the IEEE 802.16 task group includes IEEE 802.16-2004 called fixed WiMAX and IEEE 802.16e-2005 called mobile WiMAX. The IEEE 802.16e-2005 has been finally approved from the IEEE on December of 2005. The standard based on mobile WiMAX of a current version includes IEEE 802.16-2004, IEEE 802.16e-2005 (this document includes Corrigenda of IEEE 802.16-2004), and IEEE 802.16-2004/Corrigenda2/D4 (based on August of 2007). Subsequently, standardization of IEEE 802.16m for mobile WiMAX of next version is in progress by TGm within the IEEE 802.16 task group.

SUMMARY OF THE INVENTION

IEEE 802.16m (hereinafter, referred to as 16m) should support IEEE 802.16e for backward compatibility for the existing system. For this reason, generally, the IEEE 802.16m system (hereinafter named a 16m system) should operate in two kinds of modes. In particular, the 16m system is able to simultaneously support both a conventional IEEE 802.16e terminal (hereinafter named a 16e terminal) and a conventional IEEE 802.16m terminal (hereinafter named a 16m terminal) in legacy support mode. In IEEE 802.16m only mode, the 16m system just needs to support the 16-m terminal only without considering the IEEE 802.16e system (hereinafter named a 16-e system). In the following description, IEEE 802.16m will be referred to as a normal scheme, and IEEE 802.16e supported by 16m will be referred to as a legacy scheme. Also, terminology such as standard or legacy will be used for identification of the normal scheme and the legacy scheme.

FIG. 3 is an exemplary diagram for examples of multiplexing resources of 16e and 16m systems in TDD (time division duplex) in aspect of TDM (time division multiplexing) and FDM (frequency division multiplexing).

Referring to FIG. 3, a horizontal axis indicates a time domain and a vertical axis indicates a frequency domain. The frequency domain can include a logical frequency (logical subcarrier channel, resource block, resource unit, etc.). In particular, in case that a 16e system operates in PUSC (partial usage of subchannelization) mode, a set of bands (subcarrier channel, resource block, resource unit, etc.), which are not physically adjacent to each other) construct the frequency domain of the 16e system. And, the rest of non-adjacent bands construct the frequency domain of the 16m system. A permutation rule can be differently applied to each of the frequency domains of the 16e and 16m systems. Positions and configurations of a preamble, FCH frame control header), MAP and UL control are exemplarily illustrated in FIG. 3 and may differ from the real positions and configurations. And, it is important that both a legacy zone (or, a segment, region) and a 16m zone (or, a segment, region) are simultaneously supportable within a subcarrier frame using TDM and FDM.

In the legacy support mode, since the 16m system should support the 16e terminal and the 16m terminal at the same time, management of the legacy support mode may give restrictions to design of the 16m system. Also, since the 16m terminal can support the 16e system, in the case that the 16e and 16m systems support different types of resources from each other, a problem as to whether the two types of resources should be allocated in the legacy support mode occurs. Also, a problem as to how the 16m system flexibly uses the 16m ranging structure and the 16e ranging structure occurs. FIG. 4 is a diagram illustrating an example of multiplexing 16e and 16m ranging channels in view of TDM and FDM in accordance with a TDD mode.

Ranging in the 16e system is used for the following four kinds of usages: initial ranging; handover (HO) ranging, periodic ranging and bandwidth request (BR) ranging. The initial ranging is used in matching uplink time synchronization (i.e., time and frequency synchronization) when a terminal initially accesses a wireless communication system. The handover ranging is used in matching initial synchronization when an access is changed into a target base station from a source base station. The periodic ranging is used for a terminal to periodically update uplink synchronization. And, the bandwidth request ranging is used for a terminal to make a request for an uplink resource to a base station.

FIG. 5 and FIG. 6 show OFDMA (orthogonal frequency division multiple access) symbol structures used for ranging in a legacy scheme, respectively.

Referring to FIG. 5 and FIG. 6, a ranging structure is constructed with one to four OFDMA symbols according to a usage. And, the ranging structure uses a different ranging code according to the usage. In this disclosure, the ranging structure can include a ranging channel, a ranging channel structure or the like.

FIG. 7 shows a PRBS (pseudo random binary sequence) generator for ranging code generation.

Referring to FIG. 7, a ranging code is generated according to a PN (pseudo random noise) code generation formula '$1+X^1+X^4+X^7+X^{15}$'. An initial value (a seed value) inputted to a PRBS generator is 'b14 . . . b0=0, 0, 1, 0, 1, 0, 1, 1, s0, s1, s2, s3, s4, s5, s6'. In this case, 's6' indicates an LSB (least significant bit) of a PRBS initial value and it is set to 's6: s0=UL_PermBase'. In this case, 'S6' indicates an MSB (most significant bit) of UL_PermBase. It is able to generate total 256 codes using the PN generation formula. The generated codes are classified according to the corresponding usages, respectively. Start of the code used in each cell is signaled as 'S'. N codes after first S codes are used for the initial ranging, M codes next to the N codes are used for the periodic ranging, L codes next to the M codes are used for BR ranging, and O codes next to the L codes are used as HO ranging codes. In the "IEEE P802.16j/D3, "DRAFT Standard for Local and metropolitan area networks 'Part 16: Air Interface for Fixed and Mobile Broadband Wireless Access—Multihop Relay Specification'," February, 2008", which is the multihop relay specification, two types of codes for the relay station (RS) are additionally used. Subsequently to four types of codes, P codes are used as RS initial-ranging codes, and Q codes are used as RS dedicated codes.

In a ranging performing process, a ranging signal of a non-synchronized terminal may cause inter-subcarrier interference to an adjacent data/control channel in a physical frequency domain. The inter-subcarrier interference may further increase if a resource constructing a ranging channel is not adjacent on a physical frequency. Therefore, a it is able to design currently-discussed 16m ranging channel to have an organized (or adjacent) frequency band only. Yet, if a legacy support mode, as exemplarily shown in FIG. 4, is supported as FDM, it may become impossible to assign a frequency band organized for (or, adjacent to) for a 16m ranging channel. Hence, another consideration is necessary in the legacy support mode. In particular, it is able to design a 16m ranging channel to differ from a 16e ranging channel. For instance, a resource using method (e.g., permutation, resource allocation, etc.) of the 16m ranging channel may differ from that of the 16e-ranging channel.

Moreover, the 16e ranging channel has a limited coverage. FIG. 8 shows the limitation of the coverage due to a structure of the 16e ranging channel. Referring to FIG. 8, with reference of a valid OFDMA symbol length $T_0$, a correlation peak is observed at the same position if a time delay is k ($<T_0$) or (k+$T_0$). Namely, the 16e ranging channel is unable to support a case that a time delay is greater than $T_0$. Thus, the coverage of the 16e system is limited by $T_0$. And, a cell radius amounts to about 12 km if a maximum round-trip delay is taken into consideration.

According to the 16m system requirements, the 16m system should support a cell radio ranging up to 100 km. Therefore, in 16m only mode, a 16m ranging structure should have a structure different from that of a 16e ranging structure. Yet, in legacy support mode, if a cell radius supportable by the 16m ranging structure is large, a real cell radius is limited by the 16e ranging structure. Thus, since the coverage requirement is lightened, a 16m terminal is able to reuse the 16e ranging structure without considering a separate structure.

Also, in a state that the 16e terminal and the 16m terminal coexist, if every control information for the 16m terminal is transmitted separately, a problem occurs in that system overhead is increased.

Accordingly, the present is directed to a ranging structure for supporting a legacy support mode and multiplexing method thereof, which substantially obviate one or more problems due to limitations and disadvantages of the related art.

An object of the present invention is to provide a method for efficiently performing communication in a mobile communication system that supports a normal scheme and a legacy scheme at the same time.

Another object of the present invention is to provide a method for efficiently performing a ranging procedure in a mobile communication system.

Still another object of the present invention is to provide a method for efficiently controlling load caused by a ranging procedure in a mobile communication system.

Further still another object of the present invention is to provide a method for efficiently transmitting control information for performing a ranging procedure in a mobile communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of performing ranging through a terminal in a wireless communication system, which supports a normal scheme and a legacy scheme at the same time, comprises the steps of selecting a specific ranging structure from a first ranging structure that supports the normal scheme and a second ranging structure that supports the legacy scheme; and transmitting a ranging signal through the specific ranging structure, wherein the first ranging structure and the second ranging structure are set to differ in at least one of a time resource, a frequency resource and a code resource.

Preferably, the specific ranging structure is selected randomly.

Preferably, the specific ranging structure is selected based on a predetermined reference. In this case, the predetermined reference includes a probability value, terminal capability, terminal status, or their combination. Also, the probability value is varied dynamically depending on success/failure of ranging. Also, the method further includes the step of receiving information on the predetermined reference from a base station.

Preferably, the code resource used for the first ranging structure and the second ranging structure is obtained from a long code generated from different seed values. Also, the code resource used for the first ranging structure and the second ranging structure is obtained from different parts of a long code generated from a seed value. Also, the code resource used for the first ranging structure and the second ranging structure is obtained from a long code generated from a seed value using different cyclic shift values. Also, the code resource used for the first ranging structure and the second ranging structure is obtained from a long code generated from different code generation equations. Also, the code resource used for the first ranging structure and the second ranging structure has different code lengths.

Preferably, the method further comprises the step of receiving legacy information for setting the second ranging structure, wherein at least a part of the legacy information is common information and is reused as information for setting the first ranging structure.

In this case, the common information includes information on the number of legacy codes used to set the second ranging structure. At this time, the number of normal codes used for the first ranging structure is set using the number of legacy codes and offset. Also, the common information includes information on legacy time-frequency resources for the second ranging structure, and the first ranging structure is set at the relatively same location as the legacy time-frequency resources or at the location away from the legacy time-frequency resources as much as offset within a time-frequency domain allocated to the normal scheme.

Preferably, the common information includes information on total bandwidths of time-frequency resources for the second ranging structure and total subcarriers corresponding to the bandwidths. Also, the common information includes information on a total length of a time domain of time-frequency resources for the second ranging structure and the number of total OFDMA (Orthogonal Frequency Division Multiple Access) symbols corresponding to the total length.

Preferably, the common information includes information on the number of legacy slots used for the second ranging structure, and the number of normal slots used for the first ranging structure is defined using the number of legacy slots and offset.

To achieve these objects and other advantages and in accordance with the purpose of the invention, as embodied and broadly described herein, a method of performing ranging, which is performed by a terminal in a wireless communication system, according to the present invention includes the steps of selecting a specific ranging structure from at least two ranging structures differing from each other in accessibility according to terminal capability and transmitting a ranging signal in uplink using the specific ranging structure, wherein the at least two ranging structures are set to differ in at least one selected from the group consisting of a time resource, a frequency resource and a ranging code.

Preferably, the specific ranging structure is randomly selected.

Preferably, the specific ranging structure is selected based on a prescribed reference.

More preferably, the prescribed reference relates to a probability value, the terminal capability, a status of the terminal or a random combination thereof. In this case, the probability value dynamically varies according success or failure of the ranging.

More preferably, the method further includes the step of receiving information on the prescribed reference from a base station.

Preferably, the ranging codes used for the at least two ranging structures are codes generated using different seed values, respectively.

Preferably, the ranging codes used for the at least two ranging structures are codes generated to be discriminated from each other using different seed values, respectively.

More preferably, the ranging codes differ from each other in value of cyclic shift. In this case, a phase difference between the ranging codes is 90 degrees.

More preferably, the ranging codes are generated using different code generation formulas, respectively. In this case, the different code generation formulas are in inverse relation. And, the different code generation formulas include a $1+X^1+X^4+X^7+X^{15}$ PN (pseudo random noise) code generation formula and a $1+X^8+X^{11}+X^{14}+X^{15}$ PN code generation formula.

Preferably, the ranging codes differ from each other in code length according to an available system bandwidth.

Preferably, the ranging codes used for the at least two ranging structures are selected from PN (Pseudo random Noise) code, CAZAC (Constant Amplitude Zero Auto-Correlation) sequence and GCL (Generalized Chirp-Like) sequence and wherein the ranging codes used for the at least two ranging structures differ from each other.

To achieve these objects and other advantages and in accordance with the purpose of the invention, as embodied and broadly described herein, a reuse method of legacy information used for a legacy scheme in a wireless communication system, which supports a normal scheme and the legacy scheme at the same time, comprises the steps of receiving the legacy information from a control channel of the legacy scheme, wherein the received legacy information is used as information related to a specific channel of the normal scheme.

Preferably, the legacy information includes information on the number of codes for legacy signaling used for the legacy scheme, and the number of codes for normal signaling used for the specific channel of the normal scheme is set equally to the number of codes for the legacy signaling. At this time, the method further comprises the step of receiving an offset value, wherein the legacy information includes information on the number of codes for legacy signaling used for the legacy scheme, and the number of codes for normal signaling used for the specific channel of the normal scheme is set equally to a value obtained by adding the number of codes for the legacy signaling to a value calculated by a previously defined scheme from the received offset value. Also, the legacy information includes information on the number of codes for two types of legacy signaling used for the leach scheme, and the number of codes for normal signaling used for the specific channel of the normal scheme is set equally to a value obtained by adding the number of codes for each of two types of legacy signaling.

Preferably, the legacy scheme is IEEE 802.16e, the normal scheme is IEEE 802.16m, and the specific channel is a ranging channel. The legacy signaling includes one or more of initial ranging signaling, periodic ranging signaling, bandwidth request ranging signaling, handover ranging signaling, relay station initial ranging signaling, and relay station dedicated ranging signaling, which are used in the legacy scheme. The normal signaling includes one or more of initialing ranging signaling, periodic ranging signaling, bandwidth request ranging signaling, handover ranging signaling, relay station initial ranging signaling, and relay station dedicated ranging signaling, which are used in the normal scheme.

The method further comprises the step of receiving a first offset value and a second offset value, wherein the legacy information includes information on the number of codes for first legacy signaling, second legacy signaling, third legacy signaling, fourth legacy signaling and fifth legacy signaling, which are used for the legacy scheme, and the number of codes for first normal signaling used for the specific channel of the normal scheme is set equally to the number of codes for the first legacy signaling, the number of codes for second normal signaling used for the specific channel of the normal scheme is set equally to a value obtained by adding the number of codes for the second legacy signaling to a value calculated by a previously defined scheme from the received first offset value. Also, the number of codes for third normal signaling used for the specific channel of the normal scheme is set equally to a value obtained by adding the number of codes for the third legacy signaling to the number of codes for the fourth legacy signaling, and the number of codes for fourth normal signaling used for the specific channel of the normal scheme is set equally to a value obtained by adding the number of codes for the fifth legacy signaling to a value calculated by a previously defined scheme from the received second offset value.

At this time, the legacy scheme is IEEE 802.16e, the normal scheme is IEEE 802.16m, and the specific channel is a ranging channel. The first legacy signaling, the second legacy signaling, the third legacy signaling, the fourth legacy signaling and the fifth legacy signaling include one or more of initial ranging signaling, periodic ranging signaling, bandwidth request ranging signaling, handover ranging signaling, relay station initial ranging signaling, and relay station dedicated ranging signaling, which are used in the legacy scheme. The first normal signaling, the second normal signaling, the third normal signaling, the fourth normal signaling and the fifth normal signaling include one or more of initialing ranging signaling, periodic ranging signaling, bandwidth request ranging signaling, handover ranging signaling, relay station initial ranging signaling, and relay station dedicated ranging signaling, which are used in the normal scheme.

Preferably, in the time-frequency domain allocated to the normal scheme, a relative location of minimum logical frequency of the specific channel is equal to a relative location of minimum logical frequency of a channel corresponding to the specific channel in the time-frequency domain allocated to the legacy scheme, or is away from the corresponding relative location as much as offset which is previously defined.

Preferably, in the time-frequency domain allocated to the normal scheme, a relative location of start time of the specific channel is equal to a relative location of start time of a channel corresponding to the specific channel in the time-frequency domain allocated to the legacy scheme, or is away from the corresponding relative location as much as offset which is previously defined.

Preferably, the method further comprises the step of receiving a frequency offset value, and in the time-frequency domain allocated to the normal scheme, a relative location of minimum logical frequency of the specific channel is away from a relative location of minimum logical frequency of a channel corresponding to the specific channel in the time-frequency domain allocated to the legacy scheme, as much as a value calculated by a previously defined scheme from the frequency offset value.

Preferably, the method further comprises the step of receiving a time offset value, and in the time-frequency domain allocated to the normal scheme, a relative location of start time of the specific channel is away from a relative location of start time of a channel corresponding to the specific channel in the time-frequency domain allocated to the legacy scheme, as much as a value calculated by a previously defined scheme from the time offset value.

Preferably, the legacy information includes information on a total of bandwidths B1 of a frequency domain of a channel corresponding to the specific channel in the time-frequency domain allocated to the legacy scheme and a total of subcarriers $N_{sub\_c,legacy}$ corresponding to the total of bandwidths, the number of subcarriers included in the specific channel is $N_{sub\_c,16m}$, and the number of subcarriers corresponding to the basic resource allocation frequency unit is $N_{RB,Freq}$. In this case, $$N_{sub\_c,16m} = \alpha \times N_{RB,Freq} \times \max_k [\alpha \times N_{RB,Freq} \times k \leq N_{sub\_c,legacy}] \text{ and}$$

$$N_{sub\_c,16m} = \alpha \times N_{RB,Freq} \times \min_k [\alpha \times N_{RB,Freq} \times k \geq N_{sub\_c,legacy}]$$

can be obtained, wherein α represents a value previously defined by a reciprocal number (for example, 1, ½, ⅓, ¼, etc.) of a number smaller than $N_{RB,Freq}$. In the above equations, the result value of operation $$\max_{k}[\ ]$$

represents a maximum value of a natural number k that satisfies a value in [ ]. Also, the result value of operation $$\min_{k}[\ ]$$

represents a minimum value of a natural number k that satisfies a value in [ ].

Preferably, the legacy information includes information on a total of lengths T1 of a time domain of a channel corresponding to the specific channel in the time-frequency domain allocated to the legacy scheme and a total of OFDMA symbols $N_{symbol,legacy}$ corresponding to the total of lengths, the number of OFDMA symbols included in the specific channel is $N_{symbol,16m}$, and the number of OFDMA symbols corresponding to the basic resource allocation frequency unit is $N_{RB,Time}$. In this case, $$N_{symbol,16m} = \alpha \times N_{RB,Time} \times \max_{k}[\alpha \times N_{RB,Time} \times k \leq N_{symbol,legacy}] \text{ and}$$

$$N_{symbol,16m} = \alpha \times N_{RB,Time} \times \min_{k}[\alpha \times N_{RB,Time} \times k \geq N_{symbol,legacy}]$$

can be obtained, wherein α represents a value previously defined by a reciprocal number (for example, 1, ½, ⅓, ¼, etc.) of a number smaller than $N_{RB,Time}$.

Preferably, the method further comprises the step of receiving an offset value, and the legacy information includes information on the number of slots included in a channel corresponding to the specific channel in the time-frequency domain allocated to the legacy scheme, and the number of slots included in the specific channel is equal to a value obtained by adding the received offset value to the number of slots included in the corresponding channel.

In the aforementioned method, the legacy scheme is IEEE 802.16e, the normal scheme is IEEE 802.16m, the specific channel is a ranging channel, and the corresponding channel is a ranging channel.

Accordingly, the present invention provides the following effects and/or advantages.

First of all, communication can efficiently be performed in a wireless communication system that supports a normal scheme and a legacy scheme at the same time.

Secondly, a ranging procedure can efficiently be performed in the wireless communication system, and load caused by the ranging procedure can be controlled flexibly.

Thirdly, a terminal is able to deliver information on its capability/status (e.g., a presence or non-presence of H-FDD or F-FDD support, a presence or non-presence of emergency, a presence or non-presence of LBS service, etc.) through ranging.

Fourthly, the same ranging structure is available for both a 16e terminal and a 16m terminal. And, a terminal needing an emergency and/or LBS service or the like is able to use an additionally allocated ranging structure.

Finally, 16m ranging control information can efficiently be transmitted by reusing the 16e ranging control information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

1. Ranging Structure and Code for Legacy Support

Embodiment 1-1

Method of Using Time/Frequency Resource and Code

Figure 1:
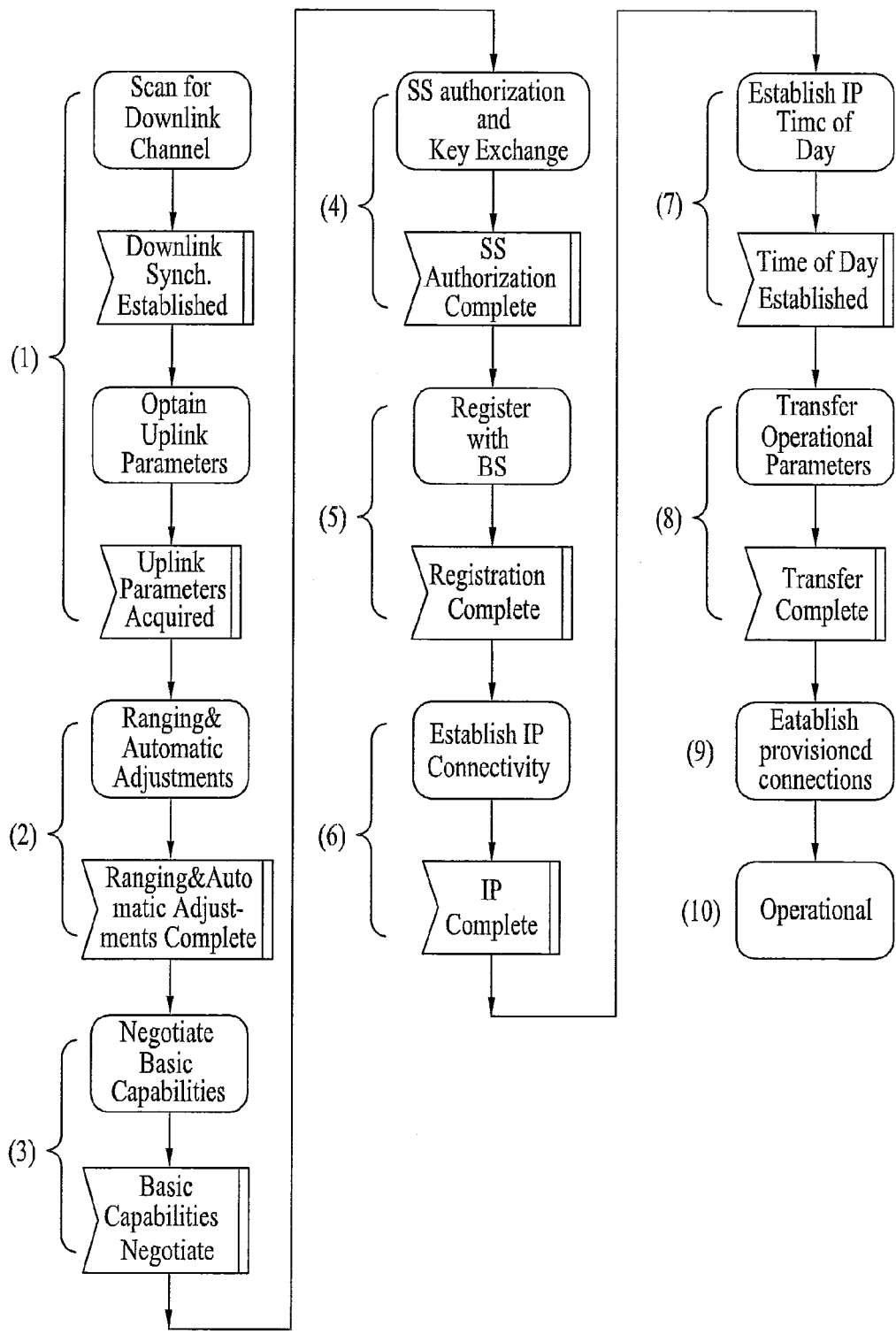
FIG. 1 is a diagram illustrating an initial network entry procedure of a terminal in a broadband wireless access system.
Figure 2:
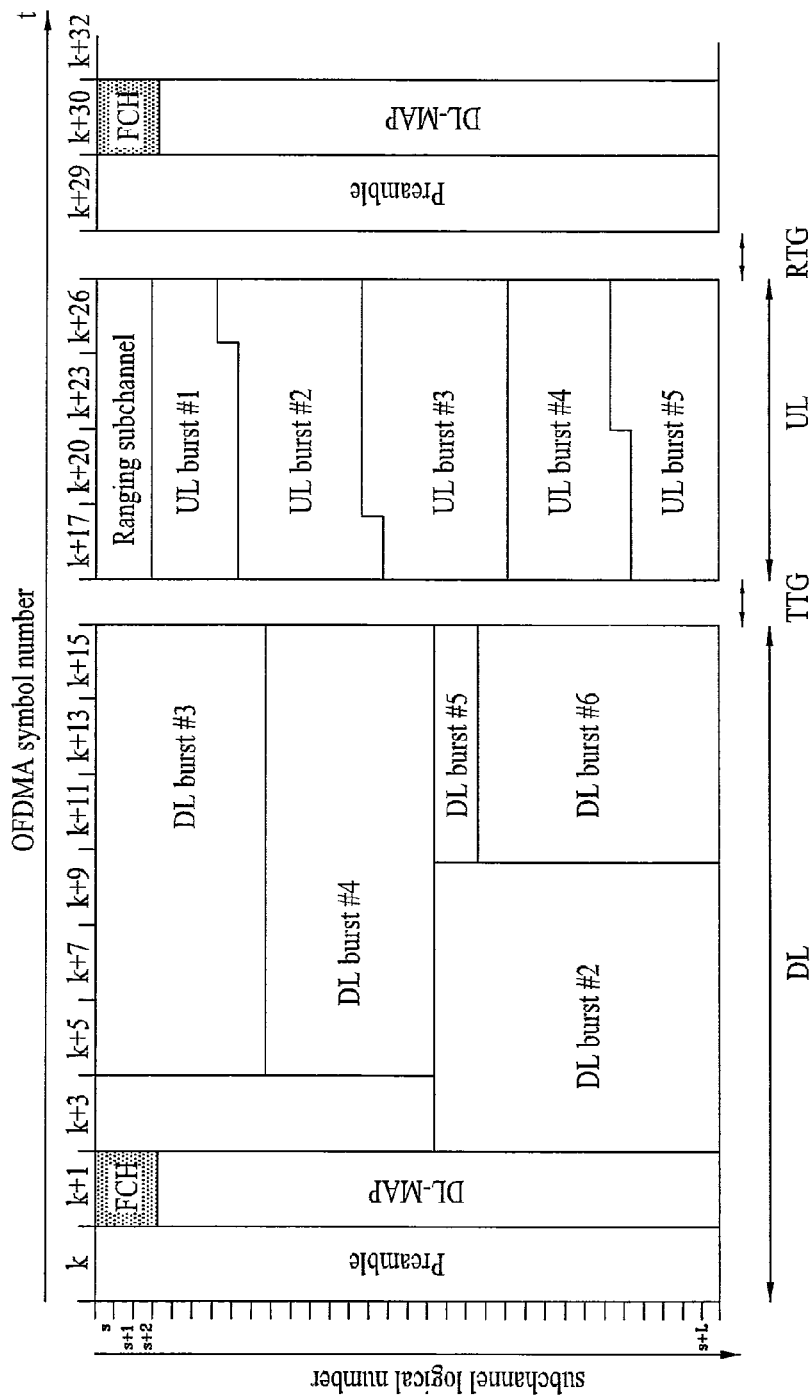
FIG. 2 is a diagram illustrating a frame structure of a physical layer of an OFDMA scheme in a broadband wireless access system.
Figure 3:
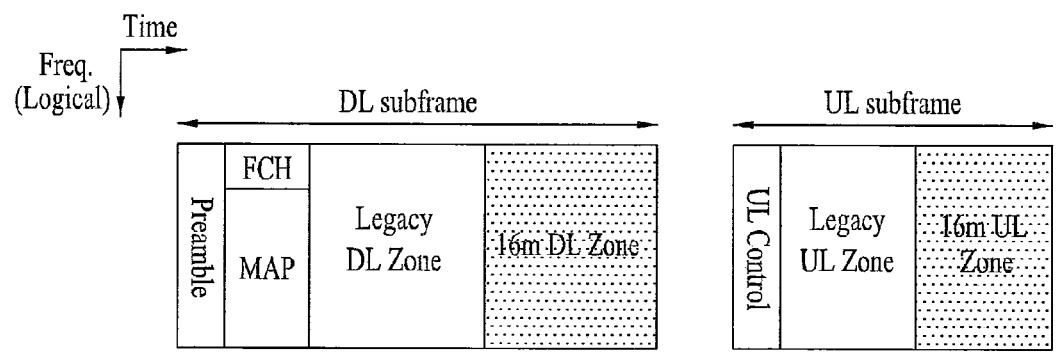
FIG. 3 is an exemplary diagram for examples of multiplexing resources of 16e and 16m systems in TDM (time division multiplexing) and FDM (frequency division multiplexing)
Figure 3:
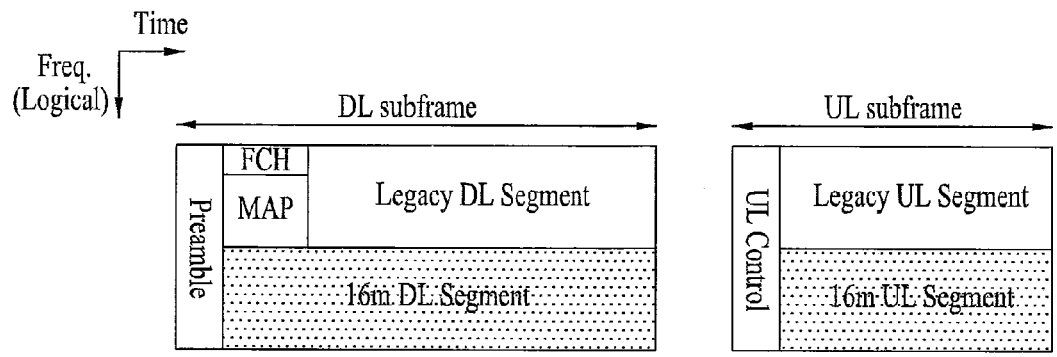
Figure 4:
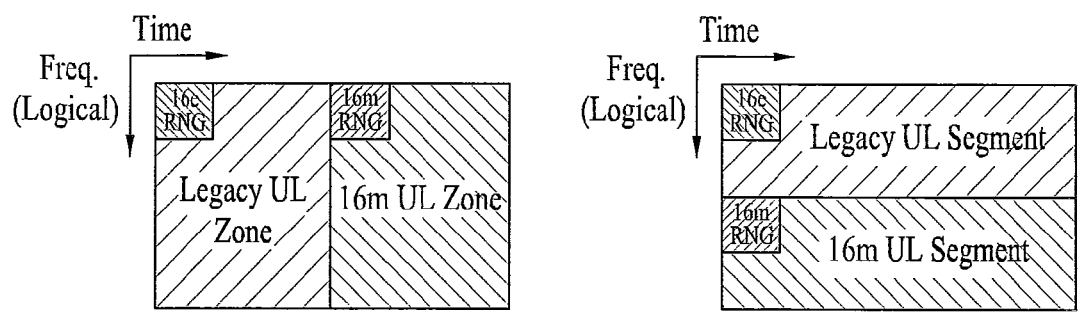
FIG. 4 is an exemplary diagram for examples of multiplexing ranging structures of 16e and 16m systems in TDM (time division multiplexing) and FDM (frequency division multiplexing)
Figure 5:
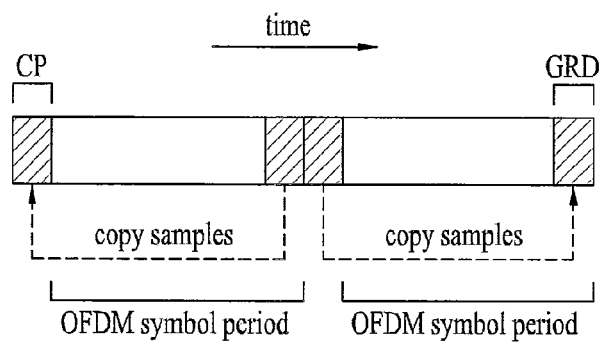
FIG. 5 and FIG. 6 are diagrams for OFDMA (orthogonal frequency division multiple access) symbol structures used for ranging, respectively.
Figure 5:
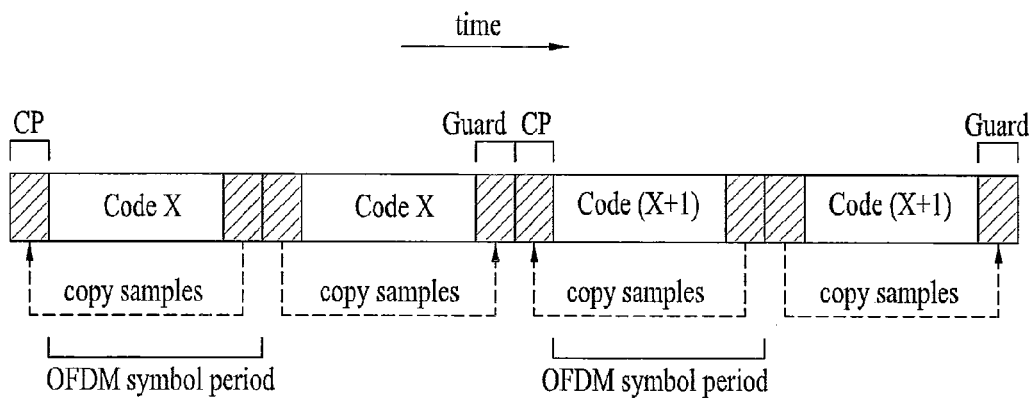
Figure 6:
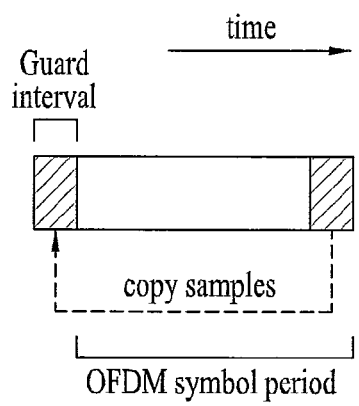
Figure 6:
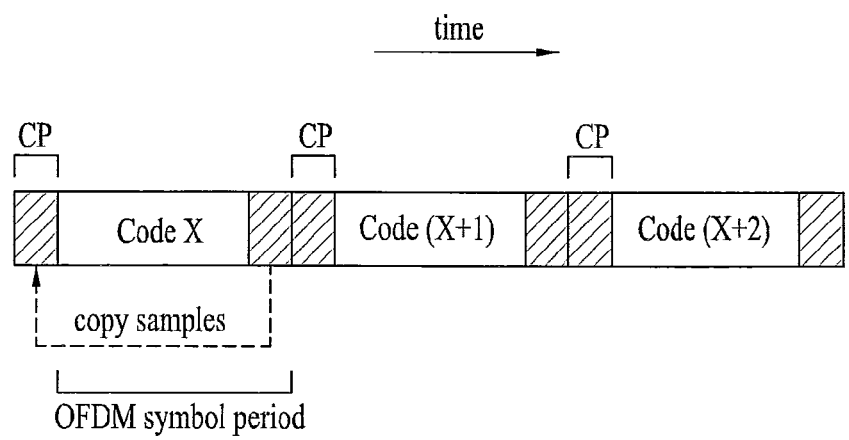
Figure 7:
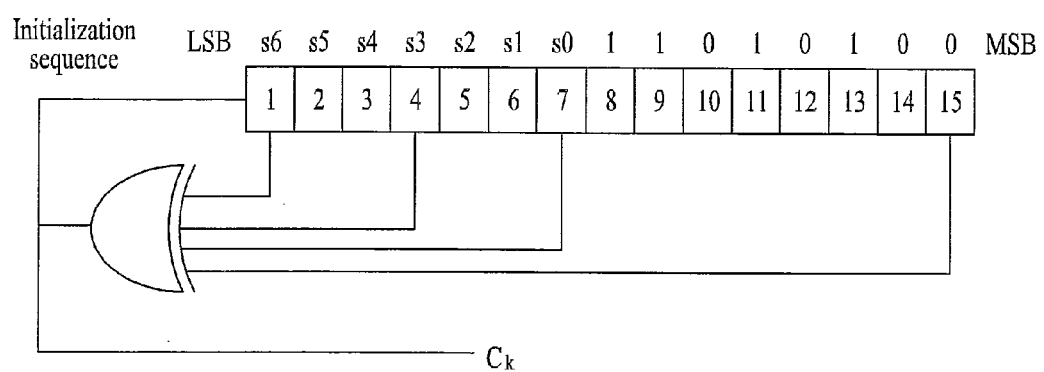
FIG. 7 is a diagram of a PRBS (pseudo random binary sequence) generator for ranging code generation.
Figure 8:
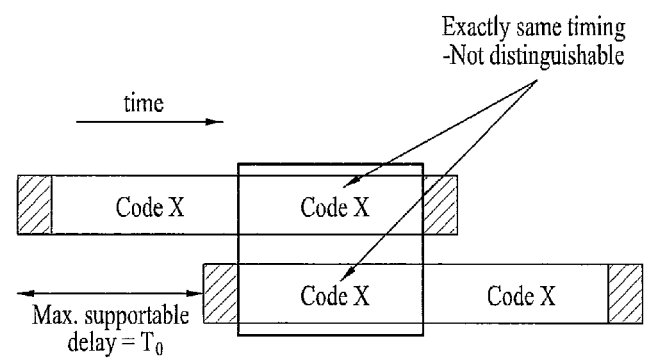
FIG. 8 is a diagram for a ranging structure in wireless MAN-OFDMA (metropolitan area network-orthogonal frequency division multiple access) reference system.
Figure 8:
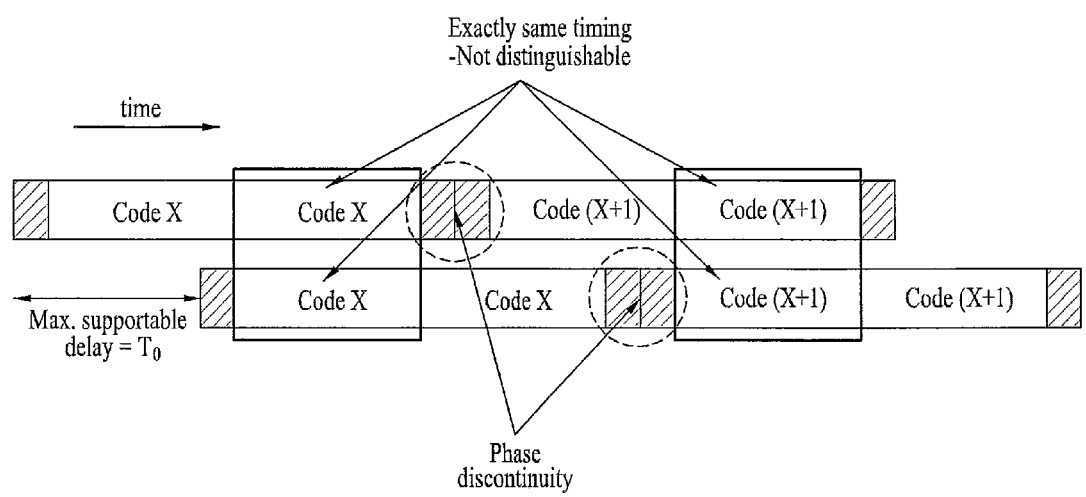
Figure 9:
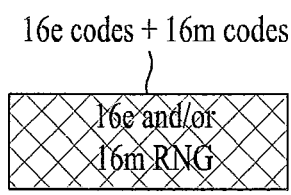
FIG. 9 is a diagram for an example of performing 16e ranging and 16m ranging in legacy support mode according to an embodiment of the present invention.
Figure 9:
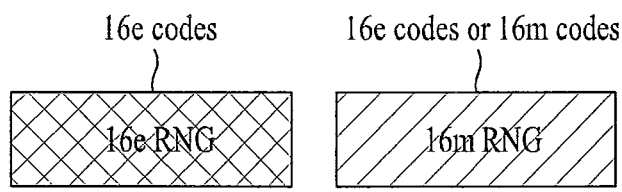
Figure 9:
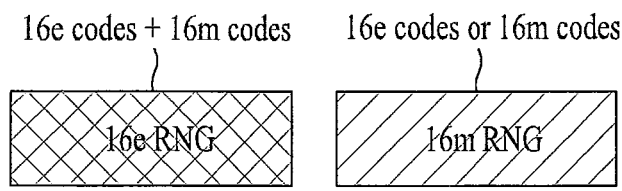

In (a) to (c) of FIG. 9, an example for discriminating a 16e ranging structure and a 16m ranging structure in legacy support mode according to time/frequency resource and/or code is shown. In this drawing, each box indicates a ranging slot.

Referring to (a) of FIG. 9, a 16e ranging structure and a 16m ranging structure use the same time/frequency resource. And, each of the ranging structures is discriminated according to a code. In this case, additional time/frequency resource allocation is unnecessary for the 16m ranging structure. In particular, a 16e terminal and a 16m terminal try ranging using 16m codes. The 16e ranging slot is usable for 16m ranging entirely or in part.

Referring to (b) of FIG. 9, a 16e ranging structure and a 16m ranging structure use different time/frequency resources, respectively. Since the 16e ranging structure and the 16m ranging structure are discriminated from each other through the time/frequency resources, codes used for the respective channels may be the same.

Yet, if a specific 16m terminal is able to use both of time/frequency resources allocated to the 16e and 16m ranging structures, a base station is unable to determine whether a terminal performing ranging is a 16e terminal or a 16m terminal. Moreover, if a 16e ranging structure and a 16m ranging structure are allocated to the same time/frequency resource between adjacent cells without code discrimination, interference increases in-between and misdetection may take place due to an adjacent cell signal. Therefore, the 16e ranging structure and the 16m ranging structure preferably use different codes in case of using different time/frequency resources, respectively.

Moreover, the time/frequency resource of the above-described 16m ranging structure can be allocated to a 16e region as well as a 16m region. In case that the time/frequency resource of the 16m ranging structure is allocated to the 16e region, it can be allocated in a manner of being overlapped with the time/frequency resource of the 16e ranging structure or can be allocated to an unused region within the 16e region. Namely, the above method is usable together with the former method exemplarily shown in (a) of FIG. 9.

The 16e ranging structure uses 16e ranging codes and 144 subcarriers×2 OFDMA symbols. Moreover, in legacy support mode, the 16m ranging structure uses 16m ranging codes and 144 subcarriers×2 OFDMA symbols. If the 16m ranging structure is allocated to a 16e region, the time/frequency resource of the 16m ranging structure may be identical to or different from that of the 16e ranging structure.

The resource allocation relation of the 16e and 16m ranging structures may depend on a selection of a base station. In case that a 16m ranging structure is allocated to 1 16e region, a 16m terminal is able to know a physical resource having a 16m ranging structure allocated thereto according to a resource allocating method (e.g., permutation, PUSC, AMC, etc.) of a 16e system. Moreover, it is able to allocate a 16m ranging structure to a 16m region. In this case, a 16m terminal is able to know a physical resource having a 16m ranging structure allocated thereto according to a resource allocating method (e.g., permutation, PUSC, AMC, etc.) of a 16e system. In particular, in legacy support mode, an allocated location of a 16m ranging structure can be limited to a 16 region or can be allocated to a 16e or 16m region without limitation.

Referring to (c) of FIG. 9, it is able to additionally allocate 16m codes to time/frequency resource for a 16e ranging structure. In this case, although a specific 16m terminal is capable of using both time/frequency resources of a 16e ranging structure and a 16m ranging structure, a base station is able to know whether a terminal attempting to perform ranging using codes allocated to each of the time/frequency resources is a 16e terminal or a 16m terminal.

16m codes allocated to the 16e ranging structure may be identical to or different from those allocated to the 16m ranging structure. Since the 16e ranging structure uses resources different from those of the 16m ranging structure, it is unnecessary to use the same codes. In this case, the 16m codes for the 16m ranging structure only can include Zadoff-Chu sequence of CAZAC (constant amplitude zero auto-correlation) series, GCL (generalized chirp-like) sequence and the like. Theses codes have cross-correlation property lower than that of the conventional 16e ranging codes when multiple users make accesses simultaneously.

In (a) to (c) of FIG. 9, the examples are illustrated based on one ranging slot, which helps the understanding of the present invention. The above-described examples are identically applicable to a case of a plurality of ranging slots. Yet, in case that the above-described examples are applied to a plurality of ranging slots, the above method is applicable to all ranging slots or to some of them. Although the above methods are separately described, they can be applicable to the case of being applied to a plurality of the ranging slots in a manner of complex combination as well.

In the above description, the time/frequency resources indicate physical locations in frequency and time domains. Even if the time/frequency resources are different from each other, the ranging structures can be substantially identical to each other. It is able to design the 16e ranging structure to be equal to or different from the 16m ranging structure. In case of TDD or FDD multiplexing of legacy 16e and 16m systems, a 16m ranging structure can be located at a 16e legacy region. On the contrary, a 16e ranging structure can be located at a 16m region. And, the present invention is non-limited by the respective ranging structures and physical locations.

Embodiment 1-2

Allocation Method of Additional 16m Ranging Codes

Assuming the exemplary situation shown in FIG. 9, it is able to set a 16m code set for a 16e ranging structure to obtain a status of a ranging-attempting terminal (e.g., 16e terminal, 16m terminal). Previous 16e codes are divided and some of the divided 16e codes can be reserved for 16m ranging. In this case, code resources used for a 16e ranging structure are reduced.

The 16m codes can be new codes irrelevant to the previous 16e codes. Considering a case that resources of the 16e ranging structure are overlapped with those of the 16m ranging structure, the new codes for the 16m ranging can less affect legacy ranging performance with good cross-correlation property in association with the codes for the 16e ranging.

Assuming a case that resources of the 16e ranging structure are not overlapped with those of the 16m ranging structure, if inter-cell interference with a code reuse factor is taken into consideration, the cross-correlation property between 16m and 16e codes works as a factor important to determine the 16m codes. The increase of cross-correlation causes the increase of a false alarm rate and the decrease of detection probability in ranging signal detection. Therefore, the cross-correlation property between new 16m codes and 16e codes should be able to secure performance similar to that between 16e codes at least.

In the following description, a method of generating 16m ranging codes is explained in detail.

Figure 10:
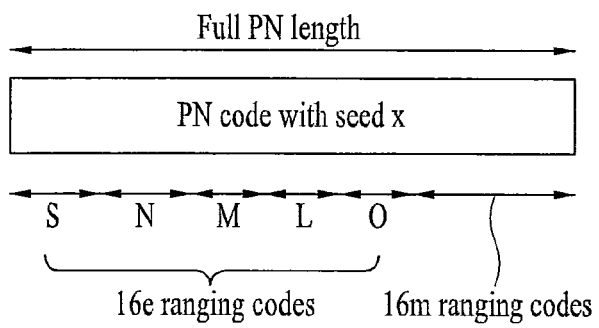
FIG. 10 and FIG. 11 are diagrams for examples of allocating codes for 16m ranging according to an embodiment of the present invention.
Figure 10:
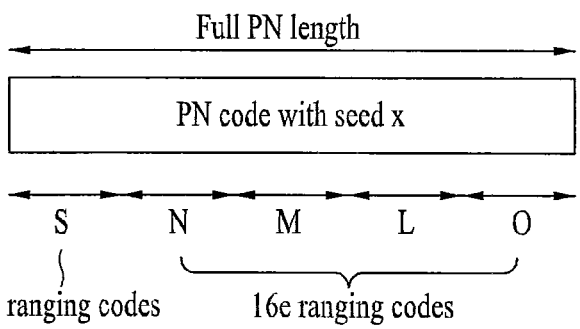
Figure 10:
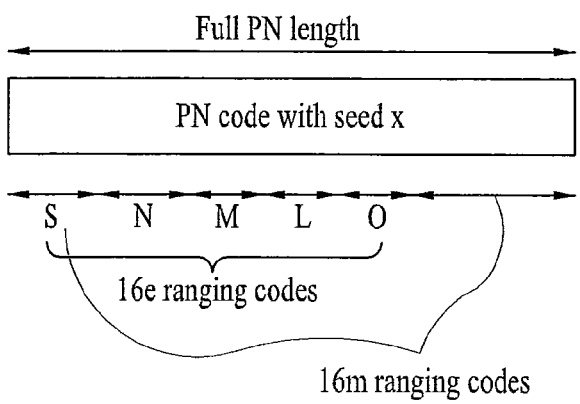

FIG. 10 shows an example of utilizing unused codes among 16e codes as 16m ranging codes.

Referring to FIG. 10, a 16e system generates a long PN code and then generates a plurality of short codes by cutting the generated long PN code into 144 units. It is able to generate total 256 short 16e codes from a long PN code generated as one seed value. The 256 short 16e codes are grouped into S, N, M, L and O in sequence. The S short 16e codes are used for each base station to use a subcarrier group for 16e codes. The N [144*(S mod 256)~144*((S+N) mod 256)−1] are used for initial ranging, the M [144*((S+N) mod 256)~144*((S+N+M) mod 256)−1] are used for periodic ranging, the L [144*((S+N+M) mod 256)~144*((S+N+M+L) mod 256)−1] are used for bandwidth request ranging, and the O[144*((S+N+M+L) mod 256)~144*((S+N+M+L+O) mod 256)−1] are used for handover, ranging.

In (a) of FIG. 10, exemplarily shown is that a sequence remaining after code allocation for ranging in each cell is usable as 16m codes.

In (b) of FIG. 10, exemplarily shown is that 'S', which is a head portion of the unused sequence in the cell is usable as 16m ranging codes.

In (c) of FIG. 10, exemplarily shown is that the methods exemplarily shown in (a) and (b) of FIG. 10 are combined to use.

Figure 11:
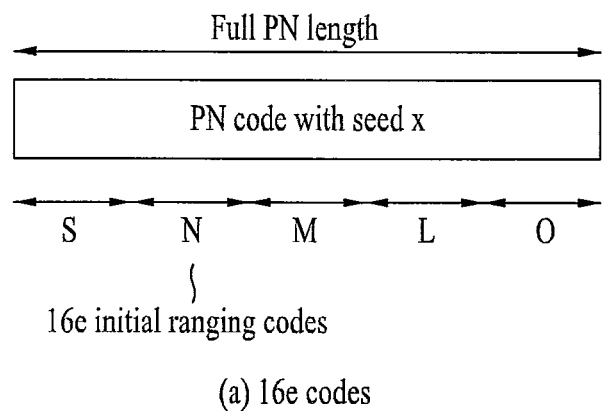
Figure 11:
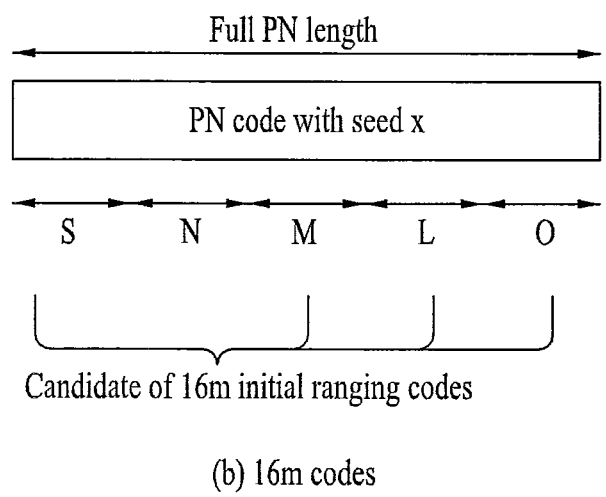

FIG. 11 shows a method of reusing 16e codes as 16m codes.

Referring to FIG. 11, in a 16e system, each 16e ranging channel one-to-one corresponds to a corresponding code set. For instance, a 16e initial ranging channel uses a code set N. Hence, if a 16m initial ranging channel uses codes (e.g., a code set S, M, L or O) other than the code set N, it is able to discriminate the 16e initial ranging channel from the 16m initial ranging channel. In particular, by changing a one-to-one correspondence relation between the 16e ranging channel and the corresponding code set, it is able to reuse the previous 16e codes as 16m codes. In this case, since the previous 16e codes are reused, cross-correlation property is secured. And, it becomes unnecessary to secure a new code resource in addition.

As mentioned in the foregoing description, if 16m codes reuse 16e codes (i.e., a seed value for code generation is equal), the cross-correlation property between the 16e and 16m codes and the corresponding ranging detection performance are maintained as good as those of the 16e system.

Figure 12:
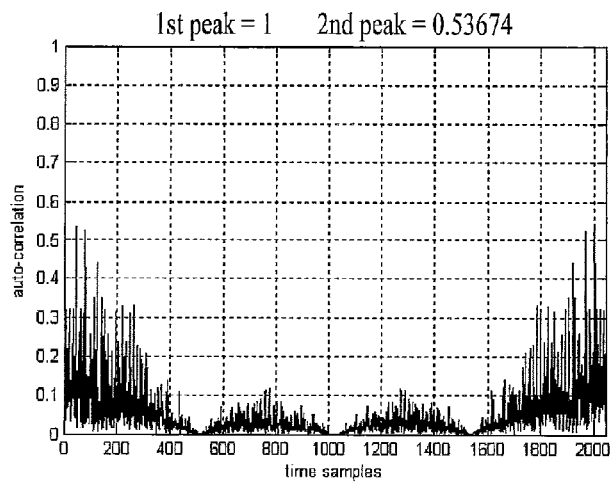
FIG. 12 is a diagram for correlation property of a ranging code used in 16e.
Figure 12:
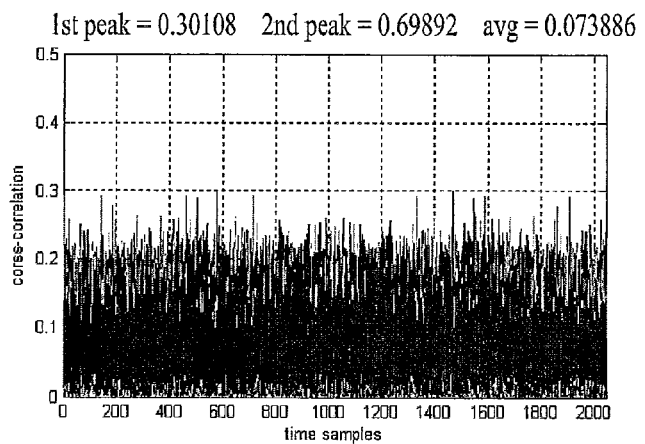
Figure 12:
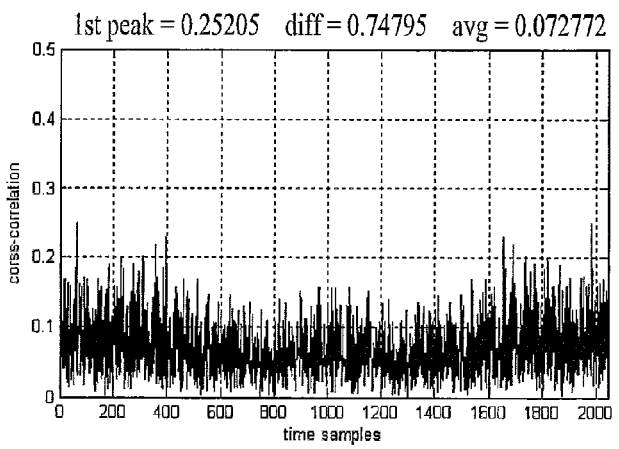

FIG. 12 shows auto-correlation properties and cross-correlation properties of codes having a seed value set to [0 0 1 0 1 0 1 1 0 0 0 0 0 0 0].

In (a) of FIG. 12, an auto-correlation graph having a peak of 1 is shown. In (b) of FIG. 12, normalized cross-correlation properties among 200 codes generated from the seed value are shown. A maximum peak is 0.30108 and an average is 0.073886. In (c) of FIG. 12, normalized cross-correlation property between a third code and 1 100$^{th}$ code is shown. A maximum peak is 0.25205 and an average is 0.072772.

Figure 13:
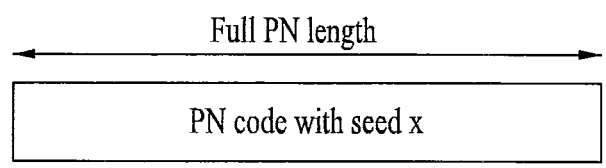
FIGS. 13 to 16 are diagrams for a method of generating a 16m ranging code by varying a seed value and correlation property of a code generated by this method.
Figure 13:
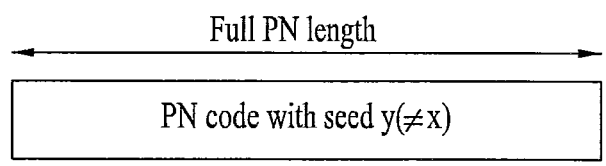

FIG. 13 shows an example of generating 16e codes and 16m codes using different seed values, respectively.

Figure 15:
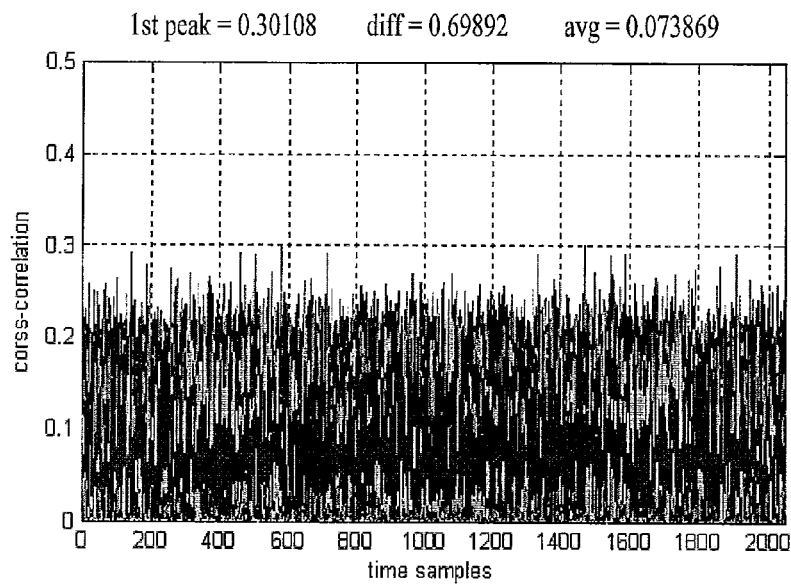
Figure 15:
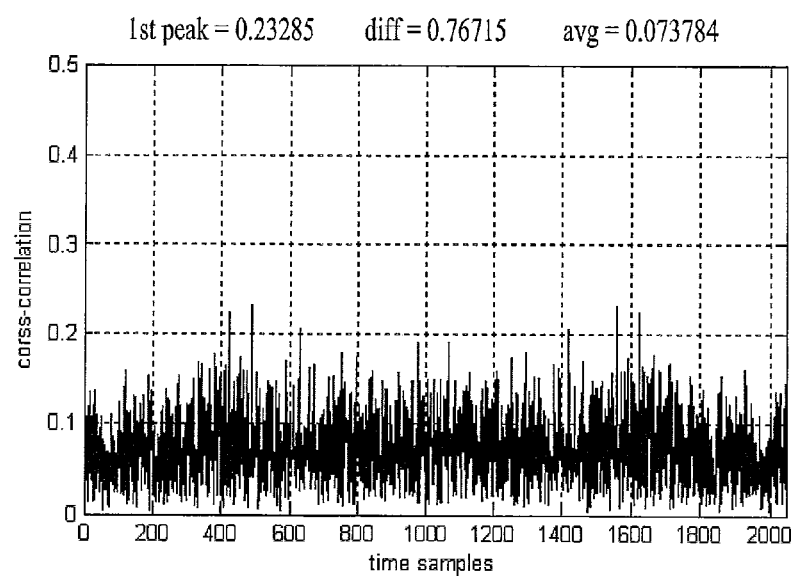
Figure 16:
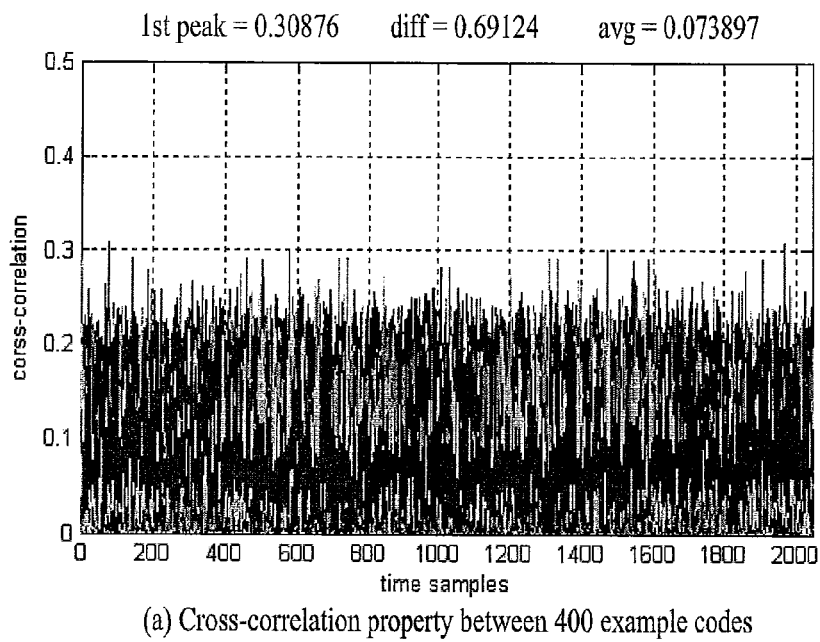
Figure 16:
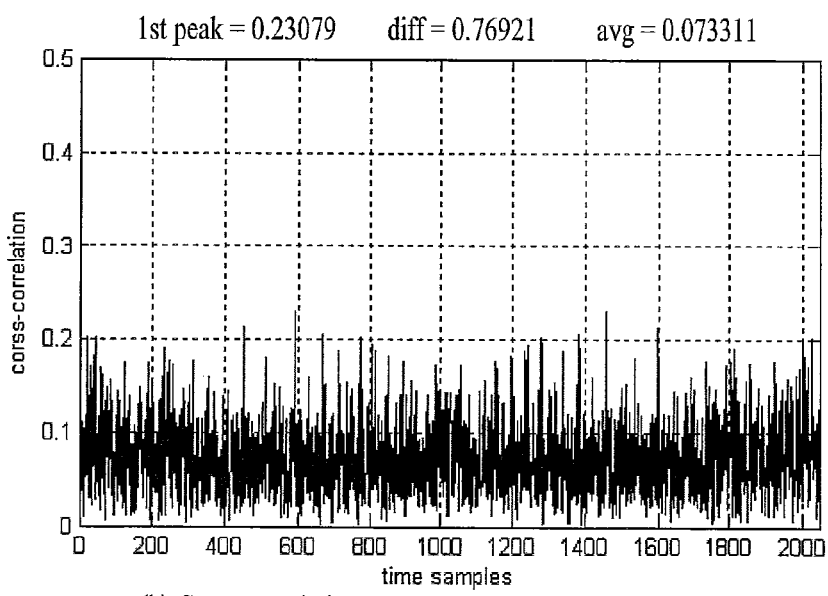

Referring to FIG. 13, 16e codes are generated using a seed value x. And, 16m codes are generated using a seed value y ($\neq$x). Cross-correlation property between codes generated using different seed values is shown in FIGS. 14 to 16.

Figure 14:
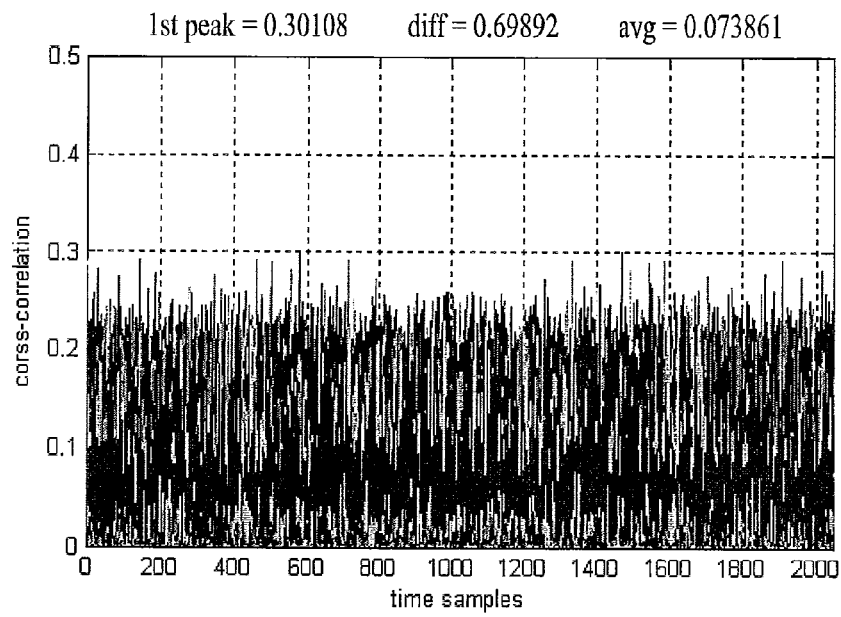
Figure 14:
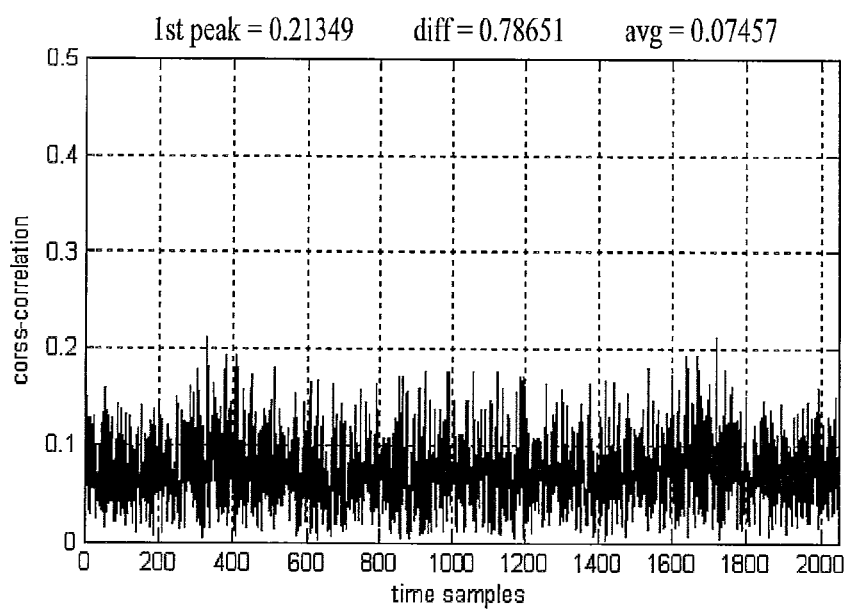

In (a) and (b) of FIG. 14, cross-correlation property between 16e codes and 16m codes generated using seed values [0 0 1 0 1 0 1 1 0 0 0 0 0 0 0] & [0 0 1 0.1 0 1 1 0 0 0 0 0 0 1], respectively are shown.

Referring to (a) of FIG. 14, normalized cross-correlation property between 16e codes (200 codes) and 16m codes (200 codes) is shown. A maximum peak is 0.30108 and an average is 0.073861.

Referring to (b) of FIG. 14, normalized cross-correlation property between 3$^{rd}$ 16e code and 100$^{th}$ 16m code is shown. A maximum peak is 0.21349 and an average is 0.07457.

In (a) and (b) of FIG. 15, cross-correlation property between 16e codes and 16m codes generated using seed values [0 0 1 0 1 0 1 1 0 0 0 0 0 0 0] & [0 0 1 0 1 0 0 1 1 0 1 0 0 0 0 0], respectively are shown.

Referring to (a) of FIG. 15, normalized cross-correlation property between 16e codes (200 codes) and 16m codes (200 codes) is shown. A maximum peak is 0.30108 and an average is 0.073869.

Referring to (b) of FIG. 15, normalized cross-correlation property between 3$^{rd}$ 16e code and 100$^{th}$ 16m code is shown. A maximum peak is 0.23285 and an average is 0.073784.

In (a) and (b) of FIG. 16, cross-correlation property between 16e codes and 16m codes generated using seed values [0 0 1 0 1 0 1 1 0 0 0 0 0 0 0] & [1 0 1 0 1 0 1 1 0 0 0 0 0 0], respectively are shown.

Referring to (a) of FIG. 16, normalized cross-correlation property between 16e codes (200 codes) and 16m codes (200 codes) is shown. A maximum peak is 0.30876 and an average is 0.073897.

Referring to (b) of FIG. 16, normalized cross-correlation property between 3$^{rd}$ 16e code and 100$^{th}$ 16m code is shown. A maximum peak is 0.23079 and an average is 0.073311.

Results of the cross-correlations shown in FIGS. 14 to 16 are summarized in Table 1.

TABLE 1

| | X & x (FIG. 12b) | X & v1 (FIG. 14a) | X & v2 (FIG. 15a) | X & v3 (FIG. 16a) |
|---|---|---|---|---|
| Max. peak | 0.30108 | 0.30108 | 0.030108 | 0.30876 |
| Difference from auto-correlation peak | 0.69892 | 0.69892 | 0.69892 | 0.69124 |
| Average | 0.073886 | 0.073861 | 0.073869 | 0.073897 |

In Table 1, 'x' is a seed vale for 16e code generation and 'y1-y3 ($\neq$x)' is a seed value for additional new 16m code generation. In (b) of FIG. 12, 16e codes and 16m codes are generated using the same seed value.

From the results, it can be observed that 16e codes and 16m codes generated using different seed values are able to maintain the cross-correlation property almost equal to that of codes generated using the same seed value.

Figure 17:
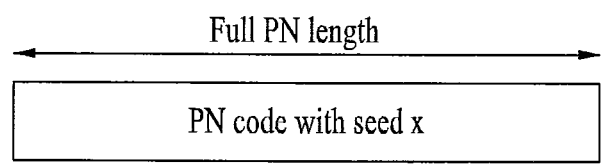
FIGS. 17 to 26 are diagrams for a method of generating a 16m ranging code by varying a phase of code and correlation property of a code generated by this method.
Figure 17:
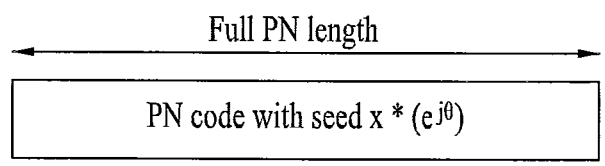

FIG. 17 shows an example of generating 16m codes by phase-shifting (or rotating) 16e codes.

Referring to FIG. 17, 16e codes are generated using a seed value x. And, 16m codes are generated by multiplying the 16e codes by $e^{j\theta}$ in a frequency domain. In this case, the 16m codes have a form of sample cyclic shift of the 16e codes in a time domain. In this case, θ indicates a size of phase shift and ranges between 0 and 2π.

If $\theta=-2\pi kl/N$, $e^{j\theta}$ becomes $e^{-2\pi kl/N}$. In this case, k indicates an element index or a subcarrier index for a full code or a code cut to use. And, N indicates a full code length or a length of a code cut to use. In particular, in case of 16e codes, N can be a full code length or a length (e.g., 144) of a code cut to use. Moreover, l indicates the number of samples cyclic-shifted in time domain. A size of a phase cyclic-shifted in frequency domain or a size of sample cyclic-sifted in time domain is not limited. Yet, considering that 16e codes are binary codes and always transferred in a real number form, it may be preferable that 16m codes are in imaginary number form of 16e codes (i.e., 90° phase shift). Cross-correlation properties between 16e codes and 16m codes generated from phase-shifting the 16e codes are shown in FIGS. 18 to 26.

In FIGS. 18 to 20, 16e codes are generated using [1 0 1 0 1 0 1 1 0 0 0 0 0 0 0] as a seed value and 16m codes are generated by multiplying the 16e codes by $e^{-2\pi kl/N}$. In this case, N is 32767, k is 0~(N−1), and l is 10, 50 or 150.

Figure 18:
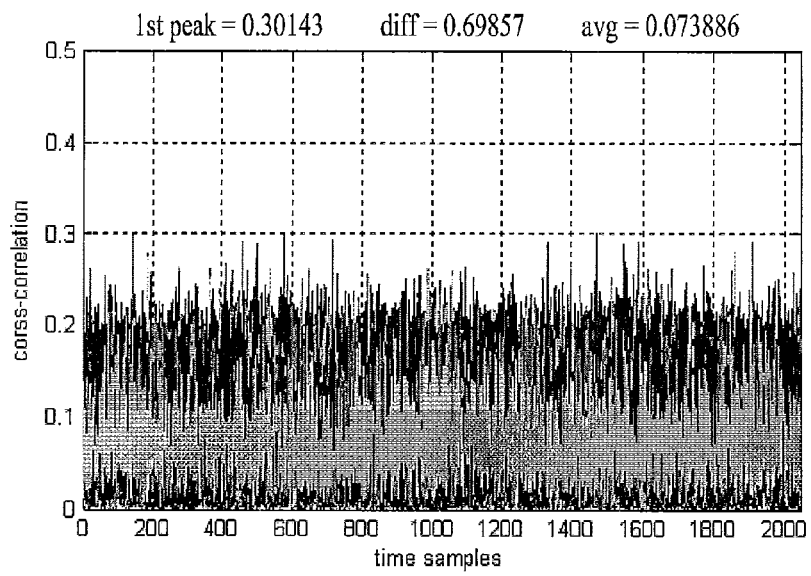
Figure 18:
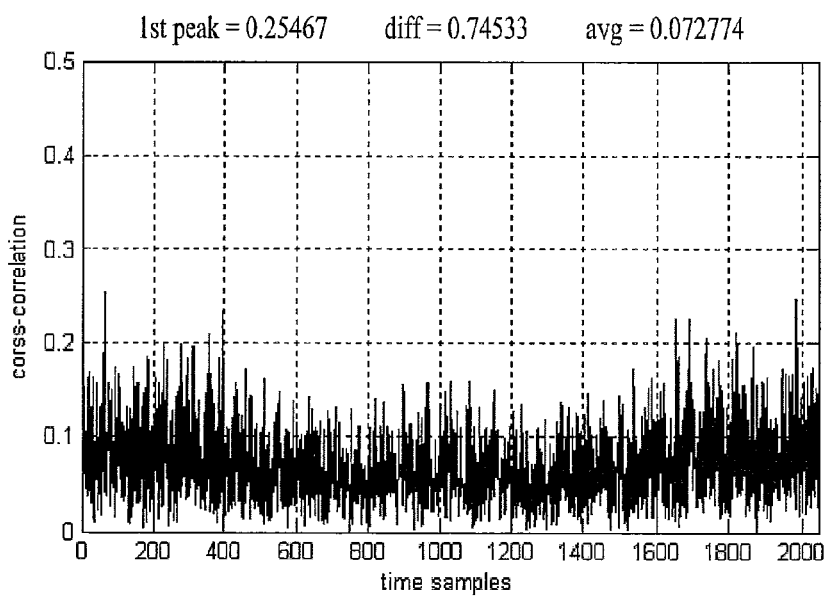

In (a) and (b) of FIG. 18, cross-correlation property between 16e codes and 16m codes generated in case of 'l=10' are shown.

Referring to (a) of FIG. 18, normalized cross-correlation property between 16e codes (200 codes) and 16m codes (200 codes) is shown. A maximum peak is 0.30143 and an average is 0.073886.

Referring to (b) of FIG. 18, normalized cross-correlation property between $3^{rd}$ 16e code and $100^{th}$ 16m code is shown. A maximum peak is 0.25467 and an average is 0.072774.

Figure 19:
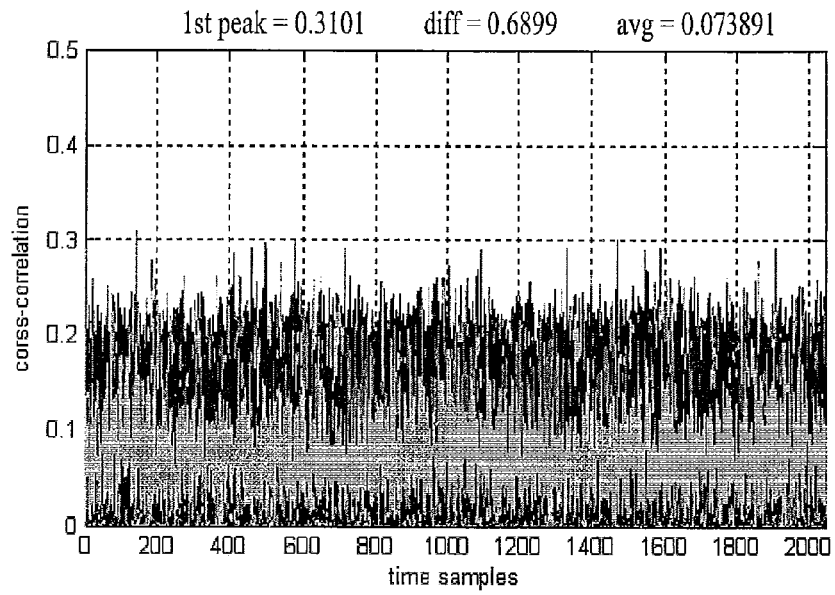
Figure 19:
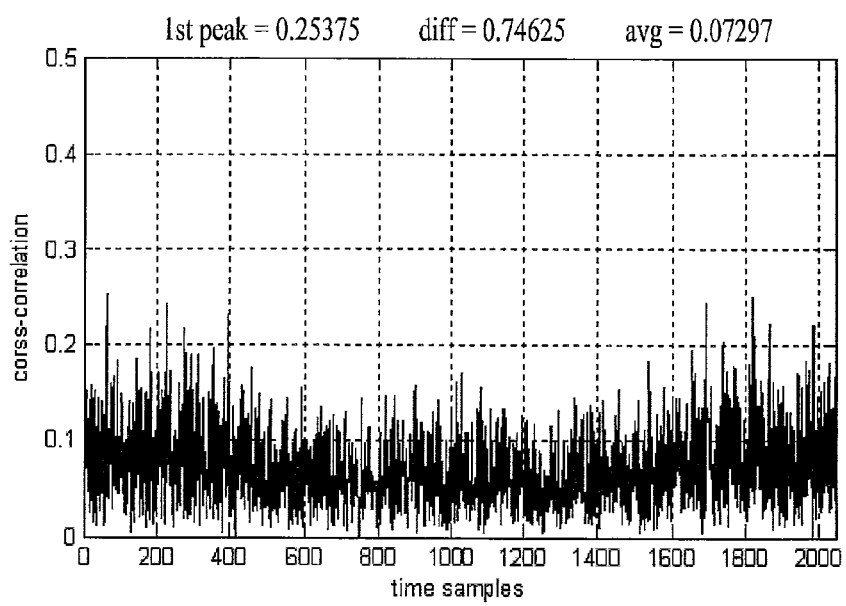

In (a) and (b) of FIG. 19, cross-correlation property between 16e codes and 16m codes generated in case of 'l=50' are shown.

Referring to (a) of FIG. 19, normalized cross-correlation property between 16e codes (200 codes) and 16m codes (200 codes) is shown. A maximum peak is 0.3101 and an average is 0.073891.

Referring to (b) of FIG. 19, normalized cross-correlation property between $3^{rd}$ 16e code and $100^{th}$ 16m code is shown. A maximum peak is 0.25375 and an average is 0.07297.

Figure 20:
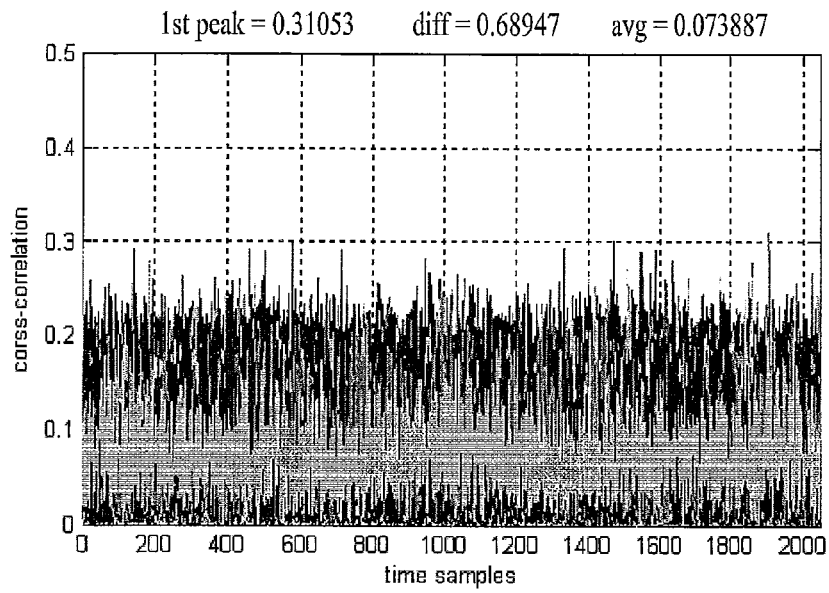
Figure 20:
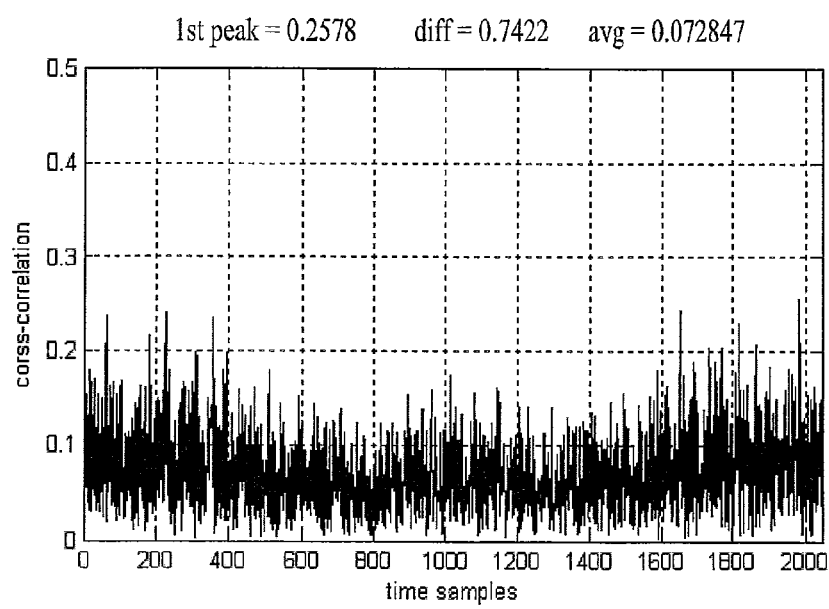

In (a) and (b) of FIG. 20, cross-correlation property between 16e codes and 16m codes generated in case of 'l=150' are shown.

Referring to (a) of FIG. 20, normalized cross-correlation property between 16e codes (200 codes) and 16m codes (200 codes) is shown. A maximum peak is 0.31503 and an average is 0.073887.

Referring to (b) of FIG. 20, normalized cross-correlation property between $3^{rd}$ 16e code and $100^{th}$ 16m code is shown. A maximum peak is 0.2578 and an average is 0.072847.

Results of the cross-correlations shown in FIGS. 18 to 20 are summarized in Table 2.

TABLE 2

| | X & x (l = 0) (FIG. 12b) | X & x (l = 10) (FIG. 18a) | X & x (l = 50) (FIG. 19a) | X & x (l = 150) (FIG. 20a) |
|---|---|---|---|---|
| Max. peak | 0.30108 | 0.30143 | 0.030101 | 0.31053 |
| Difference from auto-correlation peak | 0.69892 | 0.69857 | 0.6899 | 0.68947 |
| Average | 0.073886 | 0.073886 | 0.073891 | 0.073887 |

In Table 2, 'x' is a seed vale for 16e code generation and 'l' represents a cyclic shift size as the sample number.

From the results, it can be observed that 16e codes and 16m codes generated by multiplying the 16e codes by $e^{j\theta}$ are able to maintain the cross-correlation property almost equal to that of codes generated using the same seed value.

Figure 21:
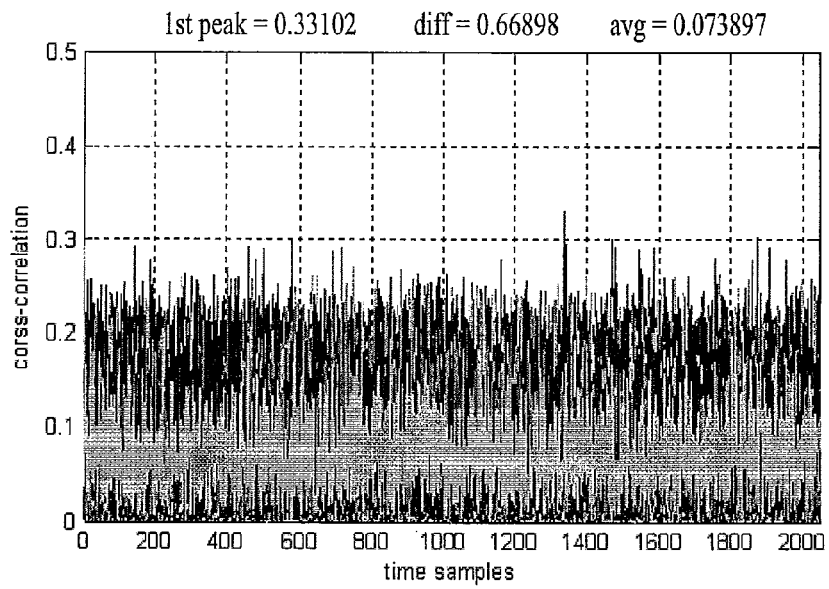
Figure 21:
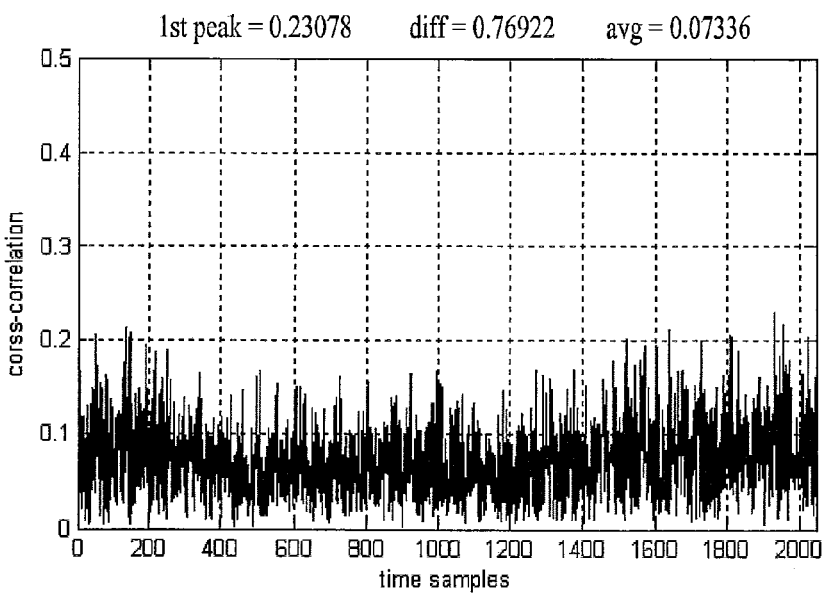
Figure 22:
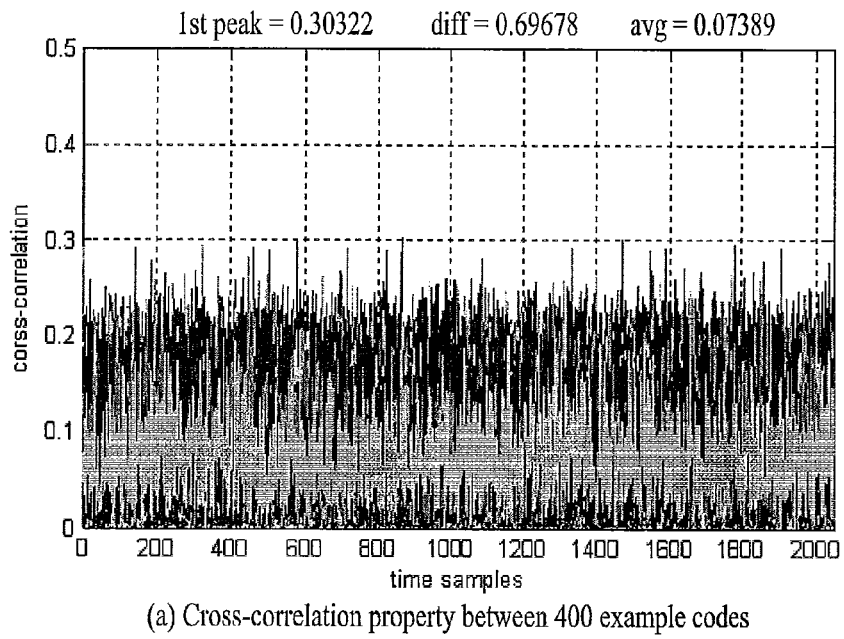
Figure 22:
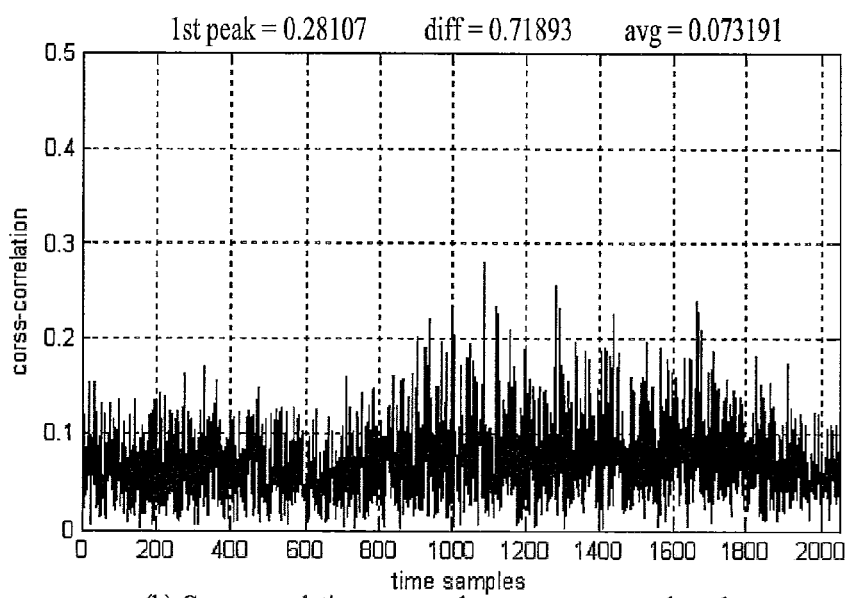
Figure 23:
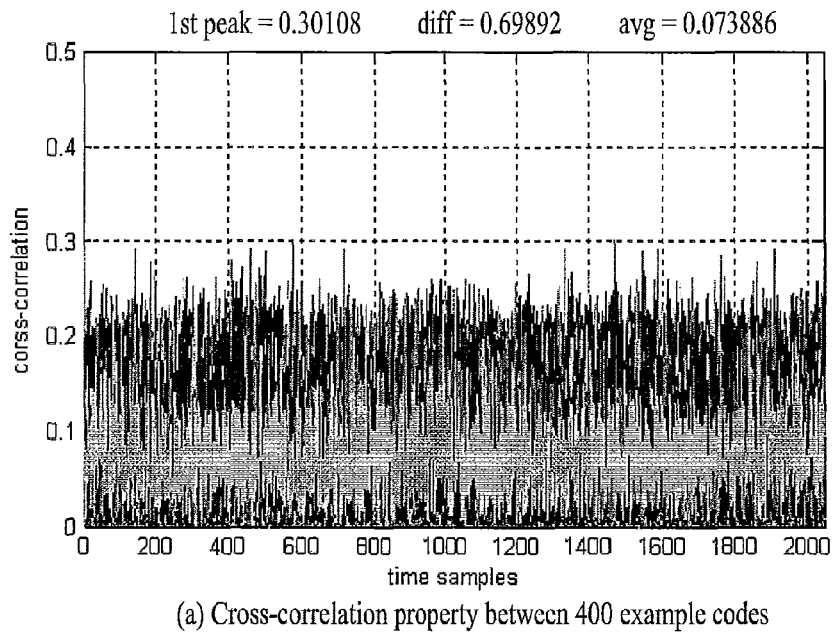
Figure 23:
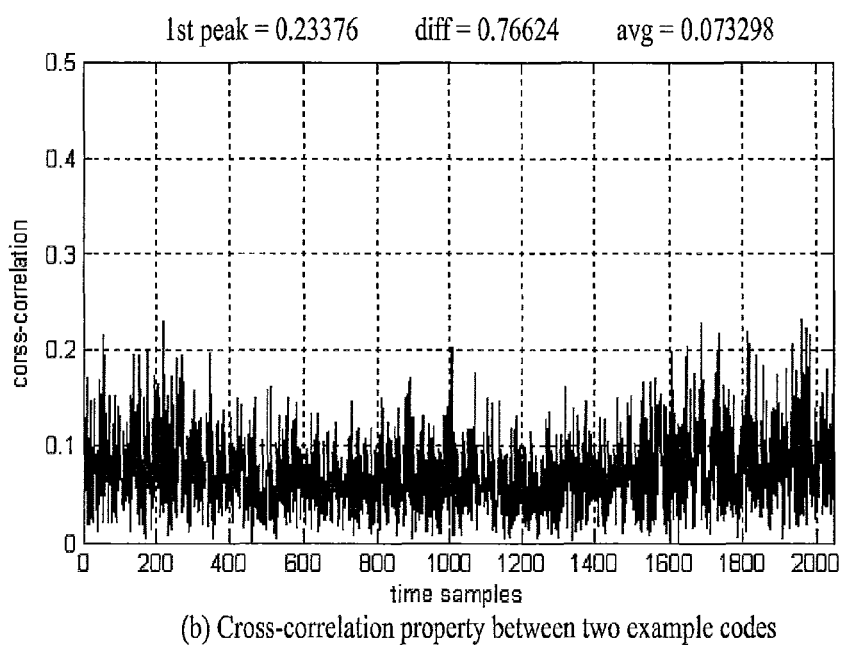

FIGS. 21 to 23 show a case of generating 16e codes using [1 0 1 0 1 0 1 1 0 0 0 0 0 0 0] as a seed value and generating 16m codes by multiplying the 16e codes by $e^{-2\pi kl/N}$. In this case, N is 144, k is 0~(32767-1), and l is 10, 50 or 150.

In (a) and (b) of FIG. 21, cross-correlation property between 16e codes and 16m codes generated in case of 'l=10' are shown.

Referring to (a) of FIG. 21, normalized cross-correlation property between 16e codes (200 codes) and 16m codes (200 codes) is shown. A maximum peak is 0.33102 and an average is 0.073897.

Referring to (b) of FIG. 21, normalized cross-correlation property between $3^{rd}$ 16e code and $100^{th}$ 16m code is shown. A maximum peak is 0.23078 and an average is 0.07336.

In (a) and (b) of FIG. 22, cross-correlation property between 16e codes and 16m codes generated in case of 'l=50' are shown.

Referring to (a) of FIG. 22, normalized cross-correlation property between 16e codes (200 codes) and 16m codes (200 codes) is shown. A maximum peak is 0.30322 and an average is 0.07389.

Referring to (b) of FIG. 22, normalized cross-correlation property between $3^{rd}$ 16e code and $100^{th}$ 16m code is shown. A maximum peak is 0.28107 and an average is 0.073191.

In (a) and (b) of FIG. 23, cross-correlation property between 16e codes and 16m codes generated in case of 'l=150' are shown.

Referring to (a) of FIG. 23, normalized cross-correlation property between 16e codes (200 codes) and 16m codes (200 codes) is shown. A maximum peak is 0.30108 and an average is 0.073886.

Referring to (b) of FIG. 23, normalized cross-correlation property between $3^{rd}$ 16e code and $100^{th}$ 16m code is shown. A maximum peak is 0.23376 and an average is 0.073298.

Results of the cross-correlations shown in FIGS. 21 to 23 are summarized in Table 3.

TABLE 3

| | X & x (l = 0) (FIG. 12b) | X & x (l = 10) (FIG. 19a) | X & x (l = 50) (FIG. 22a) | X & x (l = 150) (FIG. 23a) |
|---|---|---|---|---|
| Max. peak | 0.30108 | 0.30102 | 0.030322 | 0.30108 |
| Difference from auto-correlation peak | 0.69892 | 0.66898 | 0.6899 | 0.68947 |
| Average | 0.073886 | 0.073897 | 0.07389 | 0.073886 |

In Table 3, 'x' is a seed vale for 16e code generation and 'l' represents a cyclic shift size as the sample number.

From the results, it can be observed that 16e codes and 16m codes generated by multiplying the 16e codes by $e^{j\theta}$ are able to maintain the cross-correlation property almost equal to that of codes generated using the same seed value.

Figure 24:
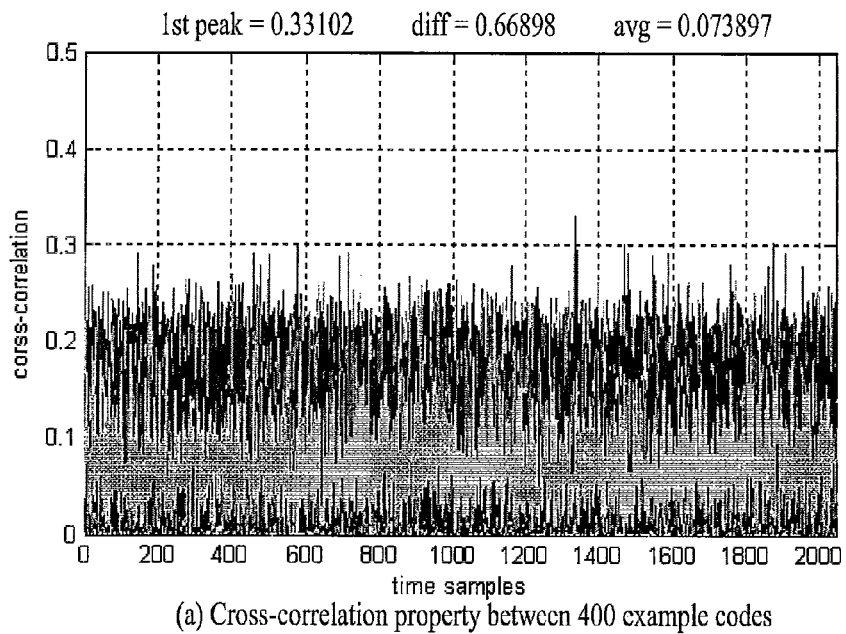
Figure 24:
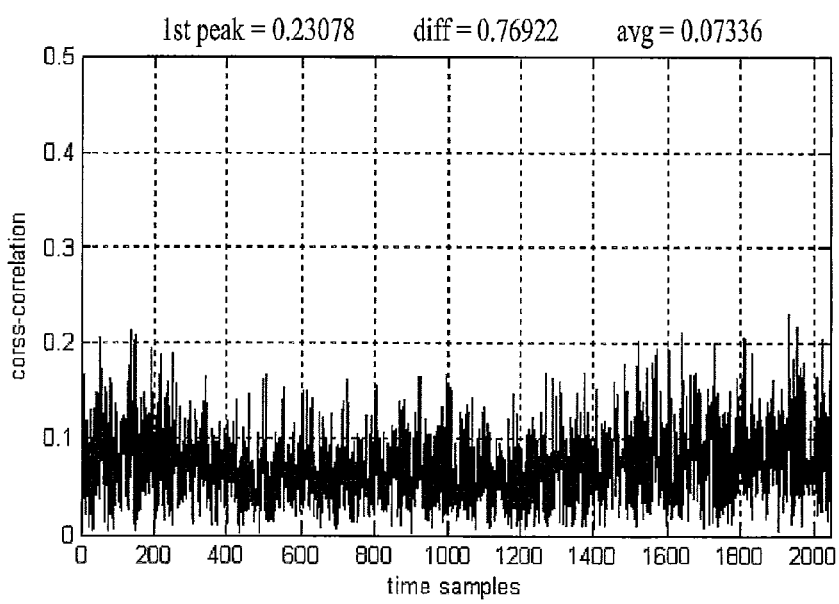
Figure 25:
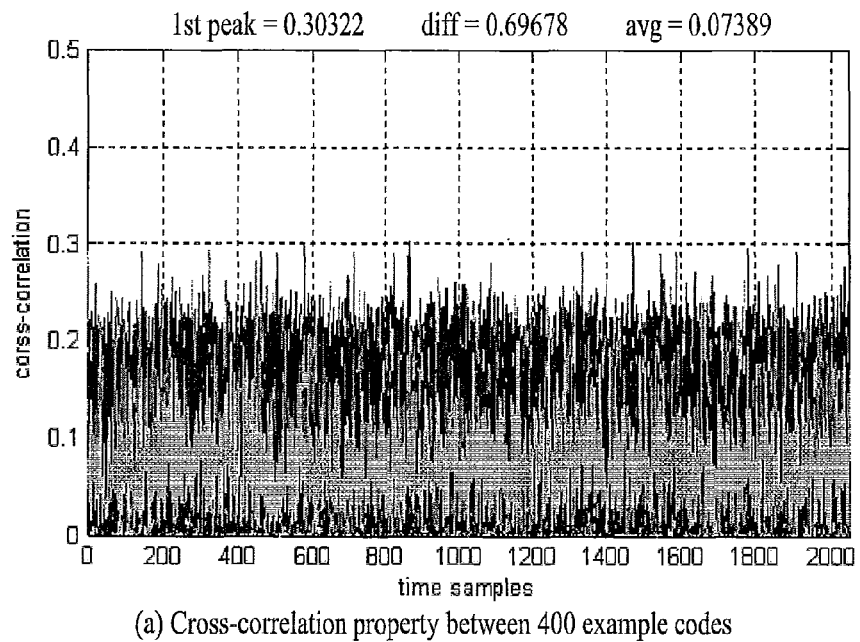
Figure 25:
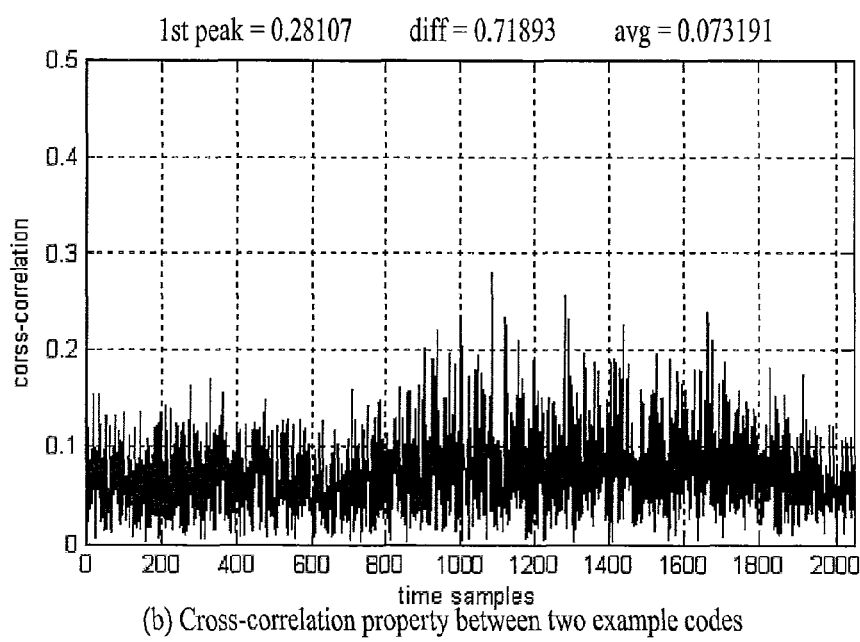
Figure 26:
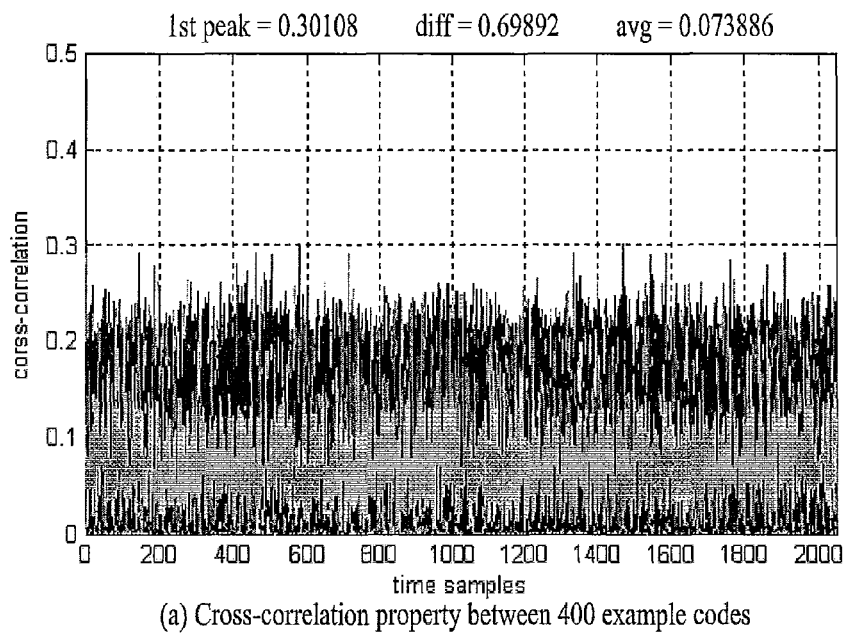
Figure 26:
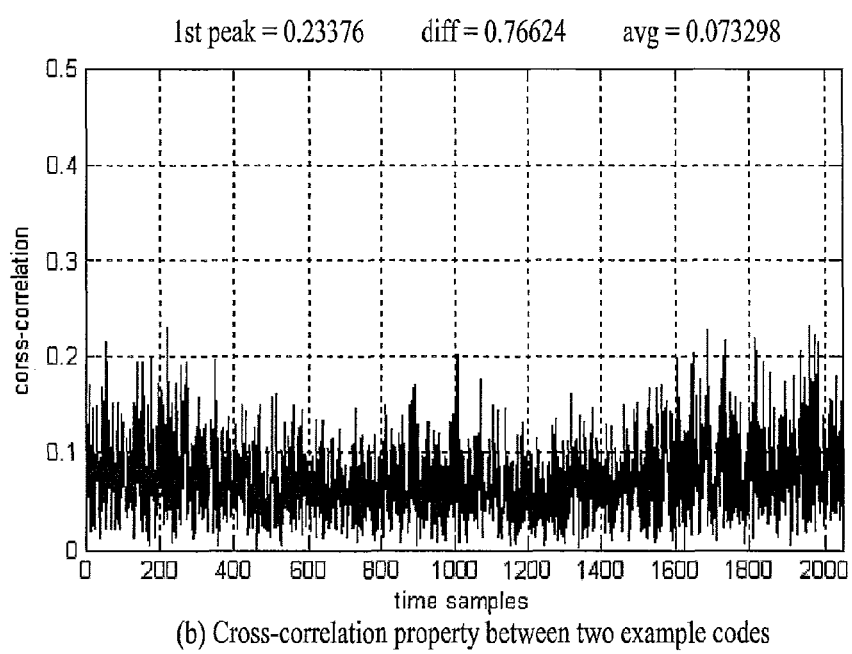

FIGS. 24 to 26 show a case of generating 16e codes using [1 0 1 0 1 0 1 1 0 0 0 0 0 0] as a seed value and generating 16m codes by multiplying the 16e codes by $e^{-2\pi kl/N}$. In this case, N is 144, k is 0~144−1) for each code cut to use, and l is 10, 50 or 150.

In (a) and (b) of FIG. 24, cross-correlation property between 16e codes and 16m codes generated in case of 'l=10' are shown.

Referring to (a) of FIG. 24, normalized cross-correlation property between 16e codes (200 codes) and 16m codes (200 codes) is shown. A maximum peak is 0.33102 and an average is 0.073897.

Referring to (b) of FIG. 24, normalized cross-correlation property between $3^{rd}$ 16e code and $100^{th}$ 16m code is shown. A maximum peak is 0.23078 and an average is 0.07336.

In (a) and (b) of FIG. 25, cross-correlation property between 16e codes and 16m codes generated in case of 'l=50' are shown.

Referring to (a) of FIG. 25, normalized cross-correlation property between 16e codes (200 codes) and 16m codes (200 codes) is shown. A maximum peak is 0.30322 and an average is 0.07389.

Referring to (b) of FIG. 25, normalized cross-correlation property between $3^{rd}$ 16e code and $100^{th}$ 16m code is shown. A maximum peak is 0.28107 and an average is 0.073191.

In (a) and (b) of FIG. 26, cross-correlation property between 16e codes and 16m codes generated in case of 'l=150' are shown.

Referring to (a) of FIG. 26, normalized cross-correlation property between 16e codes (200 codes) and 16m codes (200 codes) is shown. A maximum peak is 0.30108 and an average is 0.073886.

Referring to (b) of FIG. 26, normalized cross-correlation property between $3^{rd}$ 16e code and $100^{th}$ 16m code is shown. A maximum peak is 0.23376 and an average is 0.073298.

Results of the cross-correlations shown in FIGS. 24 to 26 are summarized in Table 4.

TABLE 4

|  | X & x (l = 0) (FIG. 12b) | X & x (l = 10) (FIG. 24a) | X & x (l = 50) (FIG. 25a) | X & x (l = 150) (FIG. 26a) |
| --- | --- | --- | --- | --- |
| Max. peak | 0.30108 | 0.30102 | 0.030322 | 0.30108 |
| Difference from auto-correlation peak | 0.69892 | 0.66898 | 0.6899 | 0.68947 |
| Average | 0.073886 | 0.073897 | 0.07389 | 0.073886 |

In Table 4, 'x' is a seed vale for 16e code generation and 'l' represents a cyclic shift size as the sample number.

From the results, it can be observed that 16e codes and 16m codes generated by multiplying the 16e codes by $e^{j\theta}$ are able to maintain the cross-correlation property almost equal to that of codes generated using the same seed value.

For another instance, 16e codes and 16m codes can be generated using different PN generation formulas, respectively. PN codes generated from different generation formulas are orthogonal to each other. The PN generation formula of 16e codes is $1+X^1+X^4+X^7+X^{15}$. Hence, it is able to use codes, which are generated using the different generation formula different from that of 16e codes, as 16m codes. In particular, codes, which are generated from the PN generation formula corresponding to an inverse number of the specific PN generation formal, has excellent cross-correlation property. The codes generated from the PN generation formula corresponding to the inverse number is equal to the codes $(x_{N-1}, x_{N-2}, \ldots, x_2, x_1)$ generated from switching the codes $(x_1, x_2, \ldots, x_{N-2}, x_1, x_2)$ generated from the original PN generation formula in reverse order. For example, it is able to generate 16m codes using $1+X^8+X^{11}+X^{14}+X^{15}$, corresponding to an inverse number of the 16e code generation formula.

Figure 27:
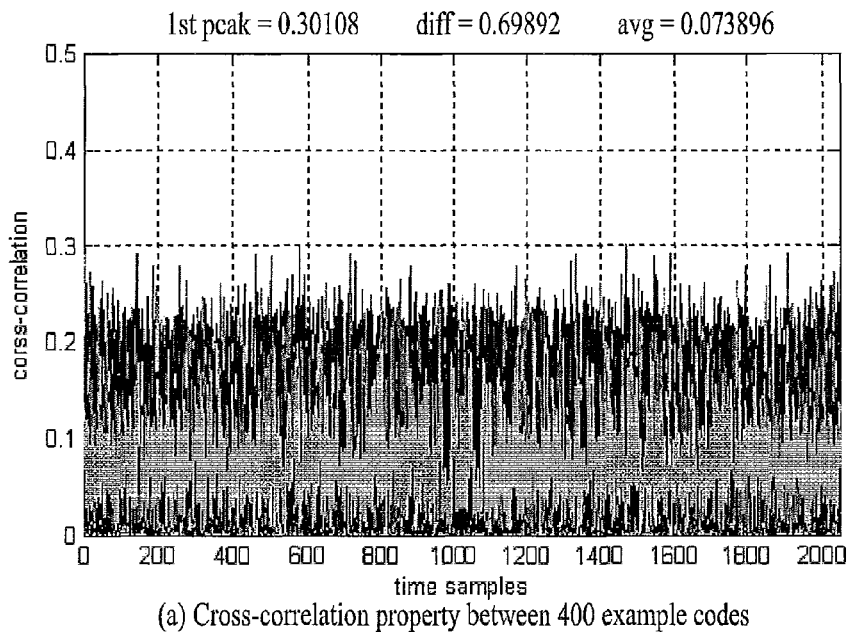
FIG. 27 is a diagram for a method of generating a 16m ranging code using a code generation formula according to an embodiment of the present invention and correlation property of a code generated by this method.
Figure 27:
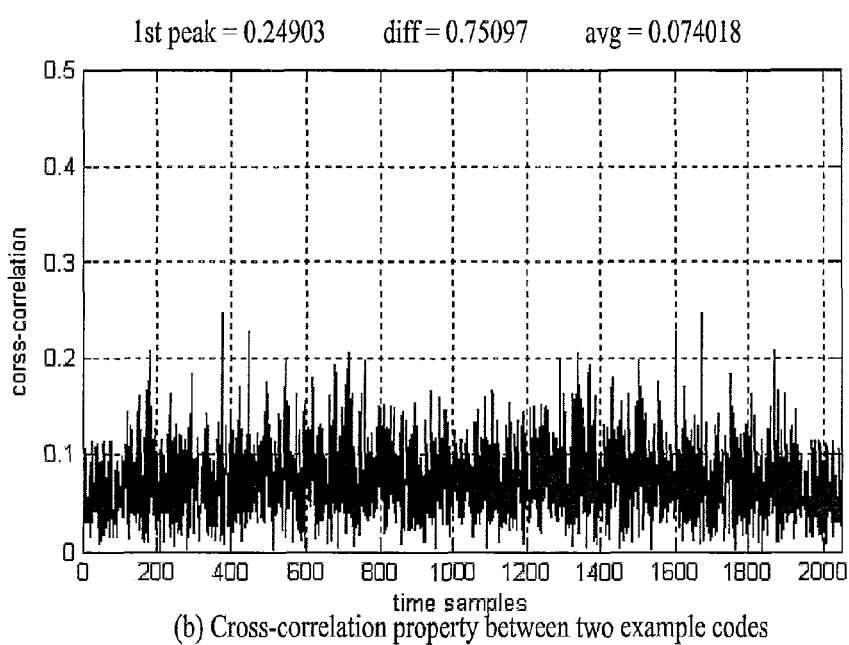

In (a) and (b) of FIG. 27, shown is cross-correlation property in case that 16e codes and 16m codes are generated using different PN generation formulas, respectively. A same seed value for generating the 16e codes and the 16m codes is [1 0 1 0 1 1 0 0 0 0 0 0 0]. The PN generation formula for the 16e code generation is $1+X^1+X^4+X^7+X^{15}$. The PN generation formula for the 16m code generation is $1+X^1+X^8+X^{14}+X^{15}$.

Referring to (a) of FIG. 27, normalized cross-correlation property between 16e codes (200 codes) and 16m codes (200 codes) is shown. A maximum peak is 0.30108 and an average is 0.0.73896.

Referring to (b) of FIG. 27, normalized cross-correlation property between $3^{rd}$ 16e code and $100^{th}$ 16m code is shown. A maximum peak is 0.24903 and an average is 0.074018.

Therefore, the 16e codes and 16m codes generated from the PN generation formulas in inverse relation are able to maintain the cross-correlation property almost equal to that of the case of the codes generated from the same PN generation formula shown in (b) of FIG. 12.

In the above example, 'using the 16e ranging structure as the 16m ranging structure intactly' means the structure of allocating a ranging code to each subcarrier as allocating data to each subcarrier based on OFDM. In this case, data subcarrier spacing is equal to ranging subcarrier spacing. A length of a ranging code, the number of subcarriers, variation in how many OFDM symbols are used in time and the like do not deviate from the meaning of the same structure.

In the above descriptions, the 16m ranging structure uses the same time/frequency resources of the 16e ranging structure and the codes having the same length of the codes of the 16e ranging structure. Yet, these descriptions are just exemplary to help the understanding of the present invention. The 16m ranging structure is able to use time/frequency resources differing from those of the 16e ranging structure and/or code length different from that of the 16e ranging structure.

The 16m ranging structure is able to use time/frequency domains smaller than those of the 16e ranging structure. And, the 16m ranging structure is bale to use a code having a length smaller than that of the code allocated to the 16e ranging structure. In this case, a frequency bandwidth of the 16m ranging structure is preferably equal to that of the ranging structure used in 16m only mode. For instance, by reducing a frequency resource to 72 subcarriers from 144 subcarriers, it is possible to use a 72-length code instead of a 144-length code. In this case, after a small code of 144-length has been generated from a long PN code, the 16e ranging structure is able to use some (e.g., 72=length code from a front) of the 144-length code only for the same operation of the 16e ranging structure.

Embodiment 1-3

Allocation Method of New 16m Ranging Codes

In the foregoing description, a method of generating 16m codes using a PN code used for 16e codes has been discussed.

In the following description, a method of generating 16m ranging codes using a code different from a short PN code shall be discussed. For instance, it is able to generate 16m ranging codes using a CAZAC sequence. In this case, it may be difficult to generate a code of a specific length due to the property of the CAZAC sequence. For example, when a length of 16m ranging code is not a prime number, the number of codes generated with orthogonality is small in case of CAZAC series sequence (e.g., ZC (Zadoff-Chu) sequence). Therefore, after a ZC sequence having a prime number length adjacent to a length of 16m ranging code has been generated, a length of the ZC sequence is preferably modified.

For instance, after a ZC sequence having a smallest prime number length among numbers greater than a necessary length has been generated, it is able to use the generated sequence in a manner of cutting the ZC sequence to have a necessary length. In case that a 16m ranging structure uses subcarriers amounting to the same number of subcarriers of a 16e ranging structure (i.e., 144 code length), a 16m ranging code can be generated by cutting 5 samples from a ZC sequence having a 149 length. A cut position may be a front or rear sample of a sequence.

For another instance, a ZC sequence having a greatest prime number length among numbers smaller than a necessary length is generated and '0' is then added thereto to provide a necessary length. For example, it is able to generate a 144-length 16m ranging code by adding zeros amounting to 5 samples to a 139-length ZC sequence. In this case, a position of the zero can be a front or rear sample of a sequence.

For another instance, a ZC sequence having a largest prime number length among numbers smaller than a necessary length is generated and cyclic extension is performed on the ZC sequence to have the necessary length. For example, a 144-length 16m ranging code can be generated in a manner of generating a 139-length ZC sequence and then performing cyclic extension on 5 samples. The cyclic extension can be performed in a manner of copying a required amount of front samples and then padding the copied samples into a rear part. Alternatively, the cyclic extension can be performed in a manner of copying a required amount of rear samples and then padding the copied samples into a front part.

2. Multiplexing

Embodiment 2-1

Load Adjustment and/or Identification

When a 16e terminal and a 16m terminal coexist, the 16e terminal is unable to use information and resources of a 16m system. In particular, the 16e terminal is able to use a 16e ranging structure only. On the contrary, the 16m terminal is able to use both of the 16m ranging structure and the 16e ranging structure. Both of the 16e and 16m terminals can exist within a cell of the 16m system. And, the number/ratio of 16e and 16m terminals can be changed in a short term or can be changed in a middle term according to the number of 16m terminals in use. Therefore, the 16m system needs a method of allocation and load adjustment of each ranging structure according to the number of the 16e terminals and the number of the 16m terminals. In particular, a method of enabling a 16m terminal to effectively use a 16e ranging structure and a 16m ranging structure is needed.

For the efficient use of 16e ranging resources and 16m ranging resources, a base station is able to adjust the number of ranging slots or a period. And, Load adjustment is enabled by flexibly varying the number of 16e ranging slots and the number of 16m ranging slots. Since the information of ranging slot is a previously broadcasted signal, a base station is facilitated to perform load adjustment without addition consideration by partially modifying information of broadcasted ranging slots. Yet, this method is limited by a period of broadcast information. And, ranging should be precisely performed by a terminal at a boundary point that ranging slot information changes. Specifically, in case of initial ranging, the switching of a position of a ranging slot may cause confusion while uplink synchronization is not matched.

Therefore, on the assumption of a position of a ranging slot fixed for prescribed duration, it is able to consider a load adjusting method. Corresponding examples are shown in FIGS. 28 to 32. Each box in the drawings indicates a ranging slot.

Figure 28:
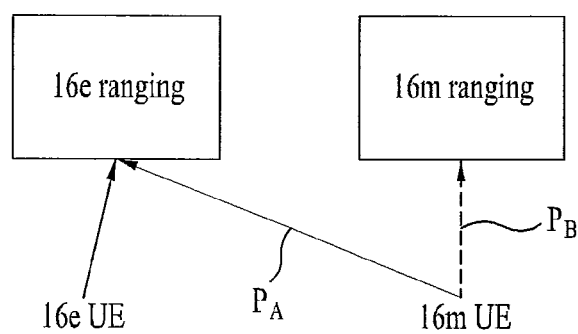
FIGS. 28 to 32 are diagrams for examples performing load adjustment according to an embodiment of the present invention.

FIG. 28 exemplarily shows a method of adjusting loads of 16e and 16m ranging slots.

Referring to FIG. 28, a 16e terminal is able to perform ranging via 16e ranging slot only. On the contrary, a 16m terminal is able to select 16e ranging slot or 16m ranging slot by a value of probability. In particular, the 16m terminal determines whether to use 16e ranging or 16m ranging according to probability of $P_A$ or $P_B$. In this case, each probability has a value ranging 0 to 1.

Figure 29:
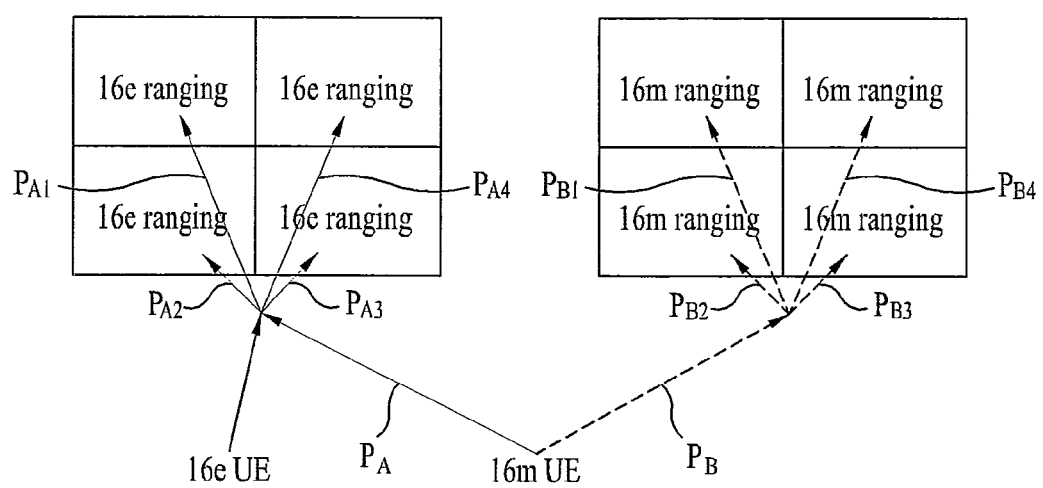

FIG. 29 exemplarily shows a load adjusting method in case of a plurality of 16e and 16m ranging slots exist.

Referring to FIG. 29, a 16m terminal first determines whether to use 16e ranging or 16m ranging within probability $P_A$ or $P_B$. Subsequently, the 16m terminal is able to determine again use a prescribed slot within the selected ranging according to probability. The slot within the 16e ranging is determined according to probability $P_{A1} \sim P_{A4}$ and the slot within the 16m ranging is determined according to probability $P_{B1} \sim P_{B4}$. In this case, each probability has a value ranging 0 to 1.

Figure 30:
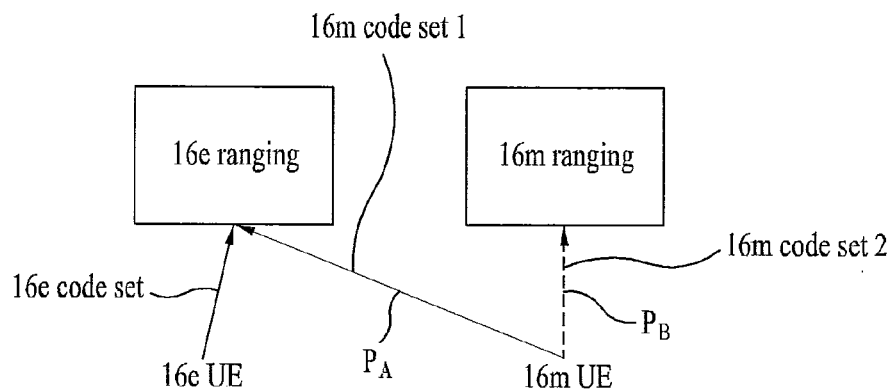

FIG. 30 exemplarily shows another method of adjusting a load in case that a plurality of ranging slots exist.

In case that the former method exemplarily shown in FIG. 29 is applied, since both of the 16e terminal and the 16m terminal simultaneously use the 16e ranging slot, a base station is unable to identify a terminal that is performing ranging. Due to this reason, if the base station allocates an uplink resource to the corresponding terminal in response to the ranging, the 16m terminal is unconditionally allocated to a legacy region irrespective of a terminal type. Therefore, the base station is preferably able to determine whether a terminal attempting the ranging is a legacy 16e terminal or a 16m terminal. In this case, the identification of the terminal type is enabled in a manner of separating a ranging code according to the terminal type.

Referring to FIG. 30, a 16e terminal attempts ranging using 16e ranging slot and 16e code set. On the other hand, a 16m terminal uses 16m code set 1 in case of using 16e ranging slot or 16m code set 2 in case of using 16m ranging slot. In this case, the 16m code set 1 may be equal to or different from the 16m code set 1. And, one code set can include the other code set. Yet, since the 16e code set and the 16m code set 1 are allocated to the same radio resource, cross-correlation between the two code sets should be good.

A base station is able to know whether a terminal attempting the ranging is a legacy 16e terminal or a 16m terminal in a manner of determining a detected code belongs to a prescribed code set in detecting the ranging. As information on the terminal attempting the ranging is usable for next resource allocation, efficient system operations are possible.

In the methods exemplarily shown in FIGS. 28 to 30, each probability value can be broadcasted via system information.

In this case, it is unnecessary to broadcast all probability values. For instance, a base station is able to broadcast $P_A$ only. And, a terminal is able to obtain $P_B$ from $(1-P_A)$. Moreover, a terminal is able to have a predetermined probability value in advance. In this case, it is unnecessary to broadcast or predetermine all probability values.

Embodiment 2-1

Terminal Information (Mobile Information)

It is able to use a method for a terminal by itself to determine whether to use a prescribed ranging structure according to capability/status information of the terminal. In this case, a base station is able to directly know status/information of the terminal via a type of a ranging structure attempted by the corresponding terminal. The terminal capability/status information can include a presence or non-presence of support of H-FDD (Half Duplex Frequency Division Duplex) or F-FDD (Half Duplex Frequency Division Duplex), a presence or non-presence of emergency, a presence or non-presence of necessity of LBS (location based service), and the like. Moreover, it is possible to apply a different probability value according to capability/status information of terminal.

Figure 31:
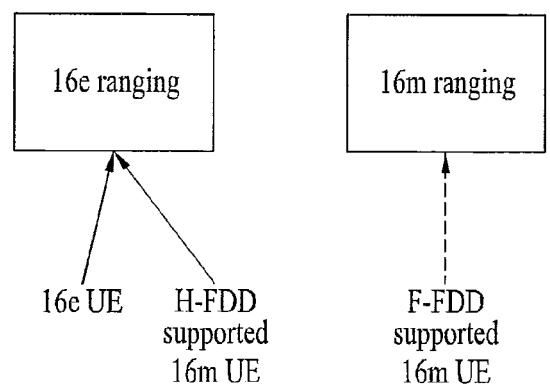

FIG. 31 shows an example that a terminal selects 16e ranging slot or 16m ranging slot according to a presence or non-presence of H-FDD or F-FDD support.

Referring to FIG. 31, a 16m terminal supporting H-FDD only uses 16m ranging slot and a 16e terminal supporting F-FDD uses 16m ranging slot. A base station is able to provide a service with F-FDD for terminals having accessed to the base station using the 16m ranging slot only.

Figure 32:
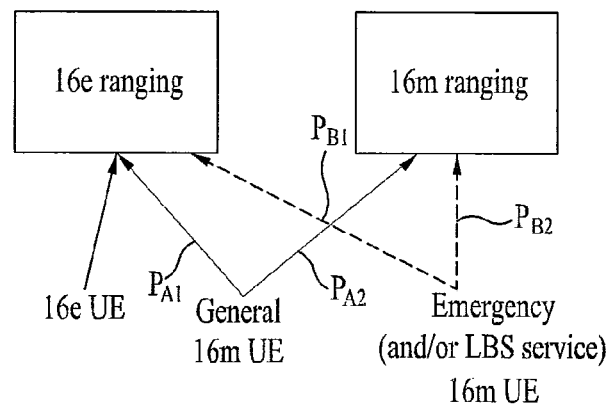

FIG. 32 shows an example that a terminal selects 16e ranging slot or 16m ranging slot according to a presence or non-presence of emergency or according to a presence or non-presence of necessity of LBS (location based service).

Referring to FIG. 32, a general 16m terminal is able to select a 16e ranging structure or a 16m ranging structure according to probability of $P_{A1}$ or $P_{A2}$. Similarly, a 16m terminal, which is in an emergency or needs an LBS, is able to select a 16e ranging structure or a 16m ranging structure according to probability of $P_{B1}$ or $P_{g2}$. In this case, it is able to freely set up the $P_{A1}$ or $P_{A2}$ by considering ranging load. Yet, $P_{B1}$ is preferably set smaller than $P_{B2}$. Considering that a 16m ranging structure has detection and delay time estimation capability better than those of a 16e ranging structure, the 16m terminal, which is in an emergency or needs an LBS, preferably attempts the ranging using the 16m ranging structure.

Probability values $P_A$ and $P_B$ can be broadcasted by a base station or can use values already known to the 16m terminal. Alternatively, a base station broadcasts one value such as $P_A$ and each terminal is able to determine a value $P_B$ by a predetermined rule. For instance, it is able to set up $P_{B1}=P_{A2}$−offset and $P_{B2}=P_{A1}$+offset. Alternatively, by setting up $P_{A1}=1$, general 16e and 16m terminals use the 16e ranging structure. And, a 16m terminal, which is in an emergency or needs an LBS, can use the 16m ranging structure only. In case that the above-described mode is used fixedly, a base station preferably uses a value already known to the 16m terminal rather than transmits a probability value.

Embodiment 2-3

Multiplexing in Case of Using Different Bandwidths

Figure 33:
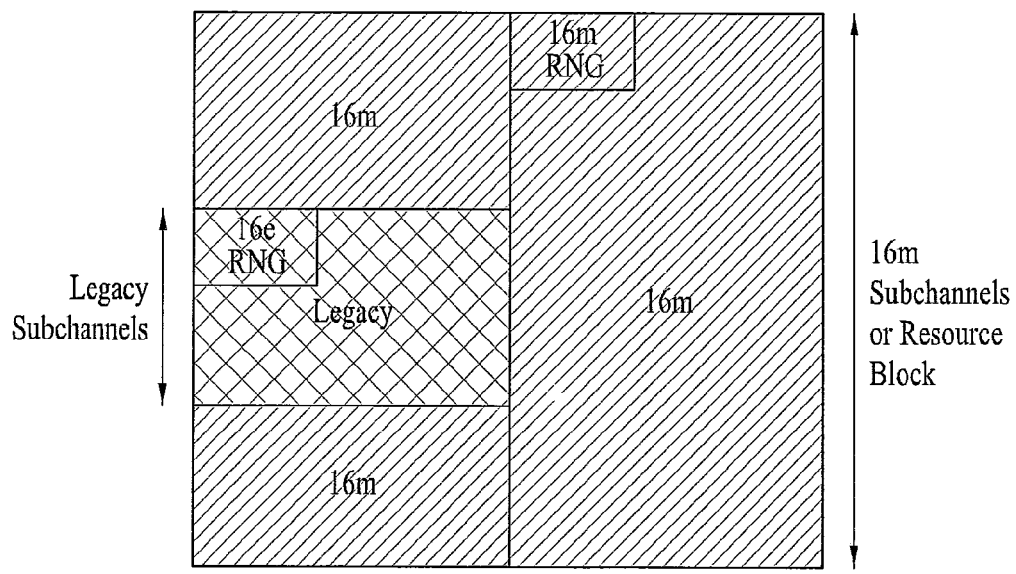
FIGS. 33 to 35 are diagrams for examples of multiplexing 16e ranging and 16m ranging according to an embodiment of the present invention in case that a legacy 16e and a legacy 16m use different frequency bands.

FIG. 33 shows a case that 16e and 16m systems use different system bandwidths, respectively.

Generally, time estimation capability is proportional to an inverse number of a frequency band occupied by a sequence. Hence, in case that a ranging structure occupies a wide band through subcarrier allocation distributed in a frequency domain, a system having a wider bandwidth has better time estimation capability. As exemplarily shown in FIG. 32, a 16m terminal, which is emergency or needs an LBS, preferably uses a 16m ranging structure with high probability. In particular, a general 16m terminal is able to select a 16e ranging structure or a 16m ranging structure with probability of $P_{A1}$ or $P_{A2}$. Similarly, a 16m terminal, which is in an emergency or needs an LBS, is able to select a 16e ranging structure or a 16m ranging structure according to probability of $P_{B1}$ or $P_{B2}$. In this case, it is able to freely set up the $P_{A1}$ or $P_{A2}$ by considering ranging load. Yet, $P_{B1}$ is preferably set smaller than $P_{B2}$. For instance, it is able to set up $P_{B1}=P_{A2}$−offset and $P_{B2}=P_{A1}$+offset. Alternatively, by setting up $P_{A1}=1$, general 16e and 16m terminals use the 16e ranging structure. And, a 16m terminal, which is in an emergency or needs an LBS, can use the 16m ranging structure only. In case that the above-described mode is used fixedly, a base station preferably uses a value already known to the 16m terminal rather than transmits a probability value.

Embodiment 2-4

Multiplexing in Multi-Carrier

Figure 34:
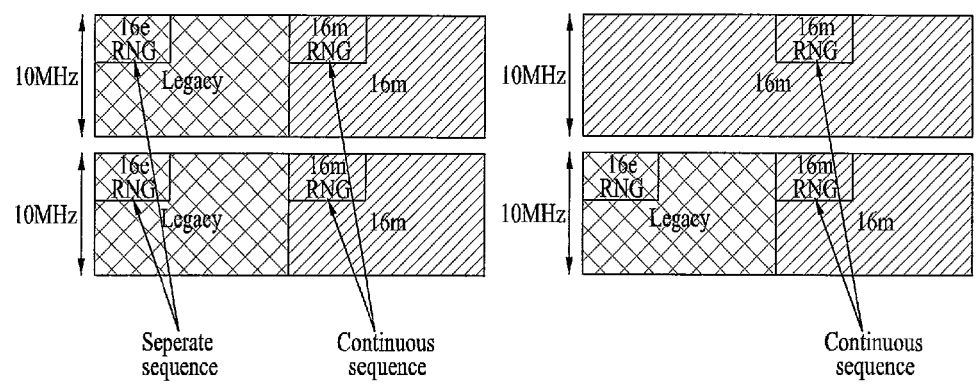

FIG. 34 shows 16e and 16m ranging structures in case of using multi-carrier.

Referring to FIG. 34, one or two legacy carriers exist. The legacy carriers exist to differ from each other. And, each of the legacy carriers can independently attempt ranging using each ranging code. Hence, 16e ranging code can use a 144-length PN code only irrespective of multi-carrier. On the contrary, 16m ranging is able to use a long code across a whole frequency band. By setting a length of 16m ranging code longer, it is able to enhance delay time estimation capability of the 16m ranging. And, it is able to apply the enhanced delay time estimation capability of the 16m ranging to a 16m terminal which is in emergency or needs an LBS. In particular, a general 16m terminal is able to select a 16e ranging structure or a 16m ranging structure with probability of $P_{A1}$ or $P_{A2}$. Similarly, a 16m terminal, which is in an emergency or needs an LBS, is able to select a 16e ranging structure or a 16m ranging structure according to probability of $P_{B1}$ or $P_{B2}$. In this case, it is able to freely set up the $P_{A1}$ or $P_{A2}$ by considering ranging load. Yet, $P_{B1}$ is preferably set smaller than $P_{B2}$. For instance, it is able to set up $P_{B1}=P_{A2}$−offset and $P_{B2}=P_{A1}$+offset. Alternatively, by setting up $P_{A1}=1$, general 16e and 16m terminals use the 16e ranging structure. And, a 16m terminal, which is in an emergency or needs an LBS, can use the 16m ranging structure only. In case that the above-described mode is used fixedly, a base station preferably uses a value already known to the 16m terminal rather than transmits a probability value.

Figure 35:
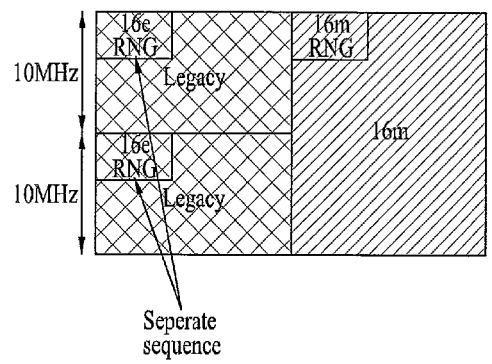

FIG. 35 shows an example of a case that a legacy 16e system and a 16m system have different frequency bands, respectively.

Referring to FIG. 35, there are two legacy regions and a 16e ranging structure is included in each of the two legacy regions. On the contrary, a 16m ranging structure has a frequency band twice greater than that of a legacy 16e ranging structure. Since the frequency band of the 16m ranging structure is greater than that of the 16e ranging structure, time estimation capability of the 16m ranging can be better. And, it is able to apply the enhanced time estimation capability to a 16m terminal which is in emergency or needs an LBS. In particular, a general 16m terminal is able to select a 16e ranging structure or a 16m ranging structure with probability of $P_{A1}$ or $P_{A2}$. Similarly, a 16m terminal, which is in an emergency or needs an LBS, is able to select a 16e ranging structure or a 16m ranging structure according to probability of $P_{B1}$ or $P_{g2}$. In this case, it is able to freely set up the $P_{A1}$ or $P_{A2}$ by considering ranging load. Yet, $P_{B1}$ is preferably set smaller than $P_{B2}$. For instance, it is able to set up $P_{B1}=P_{A2}-$offset and $P_{B2}=P_{A1}+$offset. Alternatively, by setting up $P_{A1}=1$, general 16e and 16m terminals use the 16e ranging structure. And, a 16m terminal, which is in an emergency or needs an LBS, can use the 16m ranging structure only. In case that the above-described mode is used fixedly, a base station preferably uses a value already known to the 16m terminal rather than transmits a probability value.

3. Retransmission (Re-Trial)

Embodiment 3-1

Retransmission Using Probability Value

First of all, it is able to assume that a 16m ranging structure is better than a 16e ranging structure in detection and delay time estimation capability. If ranging is not successful, it is able to assume that a channel status of a ranging slot attempted by a terminal is not good or the ranging slot is used by many terminals. If a terminal fails in ranging, it is able to raise a ranging success rate in a manner of enabling the terminal to select a 16e or 16m ranging structure with probability different from the previous one in case of a next retransmission (re-trial). For instance, even if a terminal having failed in initial ranging selects a 16e ranging structure in a first trial, it can select a 16m ranging structure in a retransmission.

Embodiment 3-2

Retransmission Using Probability Value

For another instance, it is able to vary a probability value each transmission. For example, in a first transmission, a 16e ranging structure or a 16m ranging structure is selected using $P_A$ and $P_B$. In this case, assume that a specific terminal tries ranging by selecting a 16m ranging structure but fails in the ranging. In a retransmission, the specific terminal is able to vary the probability in selecting each of the ranging structures. For example, in case of a second transmission, the specific terminal is able to select the 16 ranging structure or the 16m ranging structure using $P_A+P_C$ or $P_B-P_C$. The probability varying unit $P_C$ can be broadcasted by a base station or can be already known to a terminal.

4. Reuse of Legacy Information

The present invention suggests a reuse scheme of 16e control signaling to reduce control signaling overhead of 16m in the legacy scheme. For convenience of description, the present invention may be described based on, but not limited to, an uplink ranging channel. The present invention is not restricted by a structure of a ranging channel and types of codes in the 16m. Also, a code for a relay mode defined in the 16j will be omitted. The present invention is not restricted by such an additional code.

In the legacy scheme, various kinds of control information for performing a ranging procedure are broadcasted through an uplink channel descriptor (UCD). In this case, S is a parameter for 'Start of ranging codes group', N for 'initial ranging codes', M for 'Periodic ranging codes', L for 'bandwidth request code', and O for 'handover ranging code', wherein each parameter can have a number between 0 and 255. Information on 'backoff start' and 'backoff end' for backoff window size is also included in the UCD. A 'ranging region' having information on time/frequency domains and ranging type are also include din the UCD. Also, the UCD includes various kinds of information not described herein.

Table 5 to Table 10 illustrate examples of UCD channel encoding for each physical specification.

TABLE 5

UCD PHY-specific channel encodings-WirelessMAN-OFDMA

| Name | Type (1 byte) | Length | Value |
|---|---|---|---|
| UL AMC Allocated physical bands bitmap | 18 | 6 | A bitmap describing the physical bands allocated to the segment in the UL. When using the optional AMC permutation with regular MAPs (see 8.4.6.3). The LSB of the least significant byte shall correspond to the physical band 0. For any bit that is not set, the corresponding physical bands shall not be used by the SS on that segment. When this TLV is not present, BS may allocate any physical bands to an SS. |
| Initial ranging codes | 150 | 1 | Number of initial ranging CDMA codes. Possible values are 0-255.[a] |
| Periodic ranging codes | 151 | 1 | Number of periodic ranging CDMA codes. Possible values are 0-255.[a] |
| Bandwidth request codes | 152 | 1 | Number of BR codes. Possible values are 0 255.[a] |

TABLE 6

UCD PHY-specific channel encodings-WirelessMAN-OFDMA (continued)

| Name | Type (1 byte) | Length | Value |
|---|---|---|---|
| Periodic ranging backoff start | 153 | 1 | Initial backoff window size for periodic ranging contention, expressed as a power of 2. Range: 0 15 (the highest order bits shall be unused and set to 0). |

TABLE 6-continued

UCD PHY-specific channel encodings-WirelessMAN-OFDMA (continued)

| Name | Type (1 byte) | Length | Value |
|---|---|---|---|
| Periodic ranging backoff end | 154 | 1 | Final backoff window size for periodic ranging contention, expressed as a power of 2. Range: 0-15 (the highest order bits shall be unused and set to 0). |
| Start of ranging codes group | 155 | 1 | Indicates the starting number, S, of the group of codes used for this UL. If not specified, the default value shall be set to zero. All the ranging codes used on this UL will be between S and ((S + O + N + M + L) mod 256) where N is the number of initial ranging codes M is the number of periodic ranging codes L is the number of BR codes O is the number of HO ranging codes The range of values is $0 \leq S \leq 255$. |
| Permutation base | 156 | 1 | Determines the UL PermBase parameter for the subcarrier permutation to be used on this UL channel. UL_PermBase - 7 LSBs of Permutation base. |
| UL allocated subchannels bitmap | 157 | 9 | This is a bitmap describing the physical subchannels allocated to the segment in the UL, when using the UL PUSC permutation. The LSB of the least significant byte shall correspond to subchannel 0. For any bit that is not set, the corresponding subchannel shall not be used by the SS on that segment. When this TLV is not present, BS may allocate any subchannels to an SS. |
| Optional permutation UL Allocated subchannels bitmap | 158 | 13 | This is a bitmap describing the physical subchannels allocated to the segment in the UL, when using the UL optional PUSC permutation (see 8.4.6.2.5). The LSB of the least significant byte shall correspond to subchannel 0. For any bit that is not set, the corresponding subchannel shall not be used by the SS on that segment. When this TLV is not present, BS may allocate any subchannels to an SS. |
| Band AMC Allocation Threshold | 159 | 1 | Decibel unit. Threshold of the maximum of the standard deviations of the individual bands CINR measurements over time to trigger mode transition from normal subchannel to band AMC. Range: −128 to +127 dB |
| Band AMC Release Threshold | 160 | 1 | Decibel unit. Threshold of the maximum of the standard deviations of the individual bands CINR measurements over time to trigger mode transition from band AMC to normal subchannel. Range: −128 to +127 dB |
| Band AMC Allocation Timer | 161 | 1 | Frame unit. Minimum required number of frames to measure the average and standard deviation for the event of band AMC triggering. Range: 0 to 255 frames |
| Band AMC Release Timer | 162 | 1 | Frame unit. Minimum required number of frames to measure the average and standard deviation for the event triggering from band AMC to normal subchannel. Range: 0 to 255 frames |
| Band Status Reporting MAX Period | 163 | 1 | Frame unit. Maximum period between refreshing the band CINR measurement by the unsolicited REP-RSP. Range: 0 to 255 frames |

TABLE 7

UCD PHY-specific channel encodings-WirelessMAN-OFDMA (continued)

| Name | Type (1 byte) | Length | Value |
|---|---|---|---|
| Band AMC Retry Timer | 164 | 1 | Frame unit. Backoff timer between consecutive mode transitions from normal subchannel to band AMC when the previous request is failed. Range: 0 to 255 frames |
| Safety Channel Allocation Threshold | 165 | 1 | Decibel unit. |
| Safety Channel Release Threshold | 166 | 1 | Decibel unit. |
| Safety Channel Allocation Timer | 167 | 1 | Frame unit. |
| Safety Channel Release Timer | 168 | 1 | Frame unit. |
| Bin Status Reporting MAX Period | 169 | 1 | Frame unit. |
| Safety Channel Retry Timer | 170 | 1 | Frame unit. |
| HARQ ACK delay for DL burst | 171 | 1 | 1 - One frame offset. 2 - Two frames offset. 3 - Three frames offset. |
| CQICH Band AMC-Transition Delay | 172 | 1 | Frame unit. Range: 0 to 255 frames |
| | 174 | | Maximum number of retransmission in UL HARQ. |

TABLE 7-continued

UCD PHY-specific channel encodings-WirelessMAN-OFDMA (continued)

| Name | Type (1 byte) | Length | Value |
|---|---|---|---|
| Maximum retransmission | | | Default value shall be 4 retransmissions. |
| Normalized C/N override | 175 | 8 | This is a list of numbers, where each number is encoded by one nibble, and interpreted as a signed integer. The nibbles correspond in order to the list define by Table 512, starting from the second line, so that the LS nibble of the least significant byte corresponds to the second line in the table. The number encoded by each nibble represents the difference in normalized C/N relative to the previous line in the table. |
| Size of CQICH ID field | 176 | 1 | 0 = 0 bits(default). <br> 1-3 bits. <br> 2-4 bits. <br> 3 = 5 bits. <br> 4-6 bits. <br> 5 = 7 bits. <br> 6-8 bits. <br> 7-9 bits. <br> 8 ... 255 = Reserved. |
| Normalized C/N override 2 | 177 | 8 | Bits 0 7: It shall be interpreted as signed integer in dB. It corresponds to the normalized C/N value in the first line (counting except for header cell of table) <br> Bits 8-63: This is a list of numbers, where each number is encoded by one nibble, and interpreted as a signed integer. The nibbles correspond in order to the list define by Table 512, starting from the second line (counting except for the header cell of table), so that the LS nibble of the least significant byte corresponds to the second line in the table. The number encoded by each nibble represents the difference in normalized C/N relative to the previous line in the table. |

TABLE 8

UCD PHY-specific channel encodings-WirelessMAN-OFDMA (continued)

| Name | Type (1 byte) | Length | Value |
|---|---|---|---|
| Band AMC Entry Average CINR | 185 | 1 | Decibel unit. Threshold of the average CINR of the whole bandwidth to trigger mode transition from normal subchannel to AMC. Range: −128 to +127 dB |
| UpperBound$_{AAS\_PREAMBLE}$ | 186 | 1 | Signed in units of 0.25 dB. |
| LowerBound$_{AAS\_PREAMBLE}$ | 187 | 1 | Signed in units of 0.25 dB. |
| Allow AAS Beam Select Messages | 188 | 1 | Boolean to indicate whether unsolicited AAS Beam Select messages (see 6.3.2.3.36) should be sent by the MS. The default value is 1, with possible values of 0-1: <br> 0 MS should not send AAS Beam Select Messages <br> 1 - MS may send AAS Beam Select Messages |
| Use CQICH indication flag | 189 | 1 | The N MSB values of this field represents the N-bit payload value on the fast-feedback channel reserved as indication flag for MS to initiate feedback on the feedback header, where N is the number of payload bits used for S/N measurement feedback on the fast-feedback channel. The value shall not be set to all zeros. |
| MS-specific up power offset adjustment step | 190 | 1 | Unsigned in units of 0.01 dB. |
| MS-specific down power offset adjustment step | 191 | 1 | Unsigned in units of 0.01 dB. |
| Minimum level of power offset adjustment | 192 | 1 | Signed in units of 0.1 dB. |
| Maximum level of power offset adjustment | 193 | 1 | Signed in units of 0.1 dB |
| Handover Ranging Codes | 194 | 1 | Number of HO ranging CDMA codes. Possible values are 0-255. |
| Initial ranging interval | 195 | 1 | Number of frames between initial ranging interval allocation. |
| Tx Power Report | 196 | 3 | Bits 0-3: Tx_Power_Report_Threshold. It is unsigned integer and shall be read in dB scale. When "0b1111" it means infinite. <br> Bits 4 7: It is unsigned integer whose value is d. Its value d shall be interpreted as Tx_Power_Report_Interval -$2^d$. When "0b1111" |

TABLE 8-continued

UCD PHY-specific channel encodings-WirelessMAN-OFDMA (continued)

| Name | Type (1 byte) | Length | Value |
|---|---|---|---|
| | | | it means infinite.<br>Bits 8 11: $\alpha_{p\_avg}$ in multiples of 1/16 (range [1/16, 16/16])<br>Bits 12-15: Tx_Power_Report_Threshold, It is unsigned integer and shall be read in dB scale. When "0b1111" it means infinite. It shall be used when CQICH is allocated to the SS.<br>Bits 16 19: It is unsigned integer whose value is d. Its value d shall be interpreted as Tx_Power_Report_Interval -$2^d$ frames. When "0b1111" it means infinite. It shall be used when CQICH is allocated to the SS.<br>Bits 20-23: $\alpha_{p\_avg}$ in multiples of 1/16 (range [1/16, 16/16]), It shall be used when CQICH is allocated to the SS. |

TABLE 9

UCD PHY-specific channel encodings-WirelessMAN-OFDMA (continued)

| Name | Type (1 byte) | Length | Value |
|---|---|---|---|
| Normalized C/N for Channel Sounding | 197 | 1 | Signed integer for the required C/N (dB) for Channel Sounding. This value shall override C/N for the channel sounding in Table 513 |
| Initial_ranging_back off_start | 198 | 1 | Initial backoff window size for initial ranging contention, expressed as a power of 2. Values of n range 0 15 (the highest order bits shall be unused and set to 0) This TLV shall be used in NBR-ADV message only to represent corresponding values that appear in UCD message fields. |
| Initial_ranging_back off_end | 199 | 1 | Final backoff window size for initial ranging contention, expressed as a power of 2. Values of n range 0 15 (the highest order bits shall be unused and set to 0) This TLV shall be used in NBR-ADV message only to represent corresponding values that appear in UCD message fields. |
| Bandwidth request backoff start | 200 | 1 | Initial backoff window size for contention BRs, expressed as a power of 2. Values of n range 0-15 (the highest order bits shall be unused and set to 0). This TLV shall be used in NBR-ADV message only to represent corresponding values that appear in UCD message fields. |
| Bandwidth request backoff end | 201 | 1 | Final backoff window size for contention BRs, expressed as a power of 2. Values of n range 0-15 (the highest order bits shall be unused and set to 0). This TLV shall be used in NBR-ADV message only to represent corresponding values that appear in UCD message fields. |
| Uplink_burst_profile for multiple FEC types | 202 | 1 | May appear more than once (see 6.3.2.3.3 and 8.4.5.5). The length is the number of bytes in the overall object, including embedded TLV items. |
| UL PUSC Subchannel Rotation | 203 | 1 | Value: Indicates the default setting of subchannel rotation in the UL frame.<br>Value 0 (default) indicates UL PUSC subchannel rotation is enabled.<br>Value 1 indicates UL PUSC subchannel rotation is disabled.<br>The default setting of subchannel rotation is only valid in zones that are not preceeded by an OFDMA uplink Zone IE. If this TLV is not present, the default setting of UL PUSC subchannel rotation is enabled. |
| Relative Power Offset_For_UL_HARQ_burst | 205 | 1 | Bit#0-3: Offset for HARQ burst relative to non-HARQ burst (signed integer in 0.5 dB unit)<br>Bit#4-7: reserved (Shall be set to zero)<br>If this TLV is not present, the default value of power offset shall be equal to zero. |
| Relative Power Offset for UL Burst Containing MAC Management Message | 206 | 1 | Bit #0-2: Power offset for UL burst containing a MAC management message relative to the normal traffic burst (unsigned integer in 0.5 dB units).<br>Bit #3-7: reserved (Shall be set to zero).<br>If this TLV is not present, the default value of the power offset shall be equal to zero. |

TABLE 10

UCD PHY-specific channel encodings-WirelessMAN-OFDMA (continued)

| Name | Type (1 byte) | Length | Value |
|---|---|---|---|
| UL initial transmit timing | 207 | 1 | 0 b00000000: The timing is referenced to the 'UL_Allocation_Start_Time'.<br>0 b00000001-0 b11111110: Timing offset in unit of 2 PSs (two physical slots) before 'UL Allocation Start Time' to which the MS timing shall be referenced. If this value is larger than 'TTG − SSRTG', then MS shall consider this value as 'TTG − SSRTG'. For example, 0 b00000001 means 'initial timing reference UL_Allocation_Start_Time - 2 PSs'.<br>0 b11111111: The timing is referenced to the 'UL Allocation Start Time-TTG + SSRTG'. If this TLV is not present, the default value or initial timing at MS shall be 'UL_Allocation_Start_Time'. |
| Fast Feedback Region | 210 | 5 | Bit #0-31, Contains same fields as in the FAST FEEDBACK Allocation IE in Table 372:<br>Bits #0-2: reserved<br>Bits #3-9: num subchannels<br>Bits #10-16: num OFDMA symbols<br>Bits #17-23: subchannel offset<br>Bits #24-31: OFDMA symbol offset<br>Bit #32~34, Parameter d that defines periodicity of $2^d$ frames<br>Bit #35~39, Allocation phase expressed in frames |
| HARQ Ack Region | 211 | 4 | Bits #0-3: num subchannels<br>Bits #4-8: No. OFDMA symbols<br>Bits #9-15: Subchannel offset<br>Bits #16-23: OFDMA Symbol offset<br>Bit #24~26, Parameter d that defines periodicity of $2^d$ frames<br>Bit #27~31, Allocation phase expressed in frames<br>Note: up to two TLVs may be used for FDD/H-FDD. see 8.4.5.4.25. |
| Ranging Region | 212 | 5/10/15/20 | The value of TLV consists of up to 4 concatenated sections (one section per Ranging method), each having the following structure:<br>Bits #0: dedicated ranging indicator<br>Bits #1-2: ranging method<br>Bits #3-9: num subchannels<br>Bits #10-16: num OFDMA symbols<br>Bits #17-23: subchannel offset<br>Bits #24-31: OFDMA symbol offset<br>Bit #32~34, Parameter d that defines periodicity of $2^d$ frames<br>Bit #35~39, Allocation phase expressed in frames |
| Sounding Region | 213 | 5/10 | For 5 bytes per each sounding region<br>Bits #0: reserved<br>Bits #1-2: PAPR Reduction/Safety zone<br>Bits #3-9: num subchannels<br>Bits #10-16: num OFDMA symbols<br>Bits #17-23: subchannel offset<br>Bits #24-31: OFDMA symbol offset<br>Bit #32~34, Parameter d that defines periodicity $2^d$ frames<br>Bit #35~39, Allocation phase expressed in frames |
| MS Transmit Power Limitation Level | 214 | 1 | Unsigned 8-bit integer. Specifies the maximum allowed MS transmit power. Values indicate power levels in 1 dB steps starting from 0 dBm. |

*The total number of codes shall be equal or less than 256.

Embodiment 5-1

Reuse Method of Code Information

Figure 36:
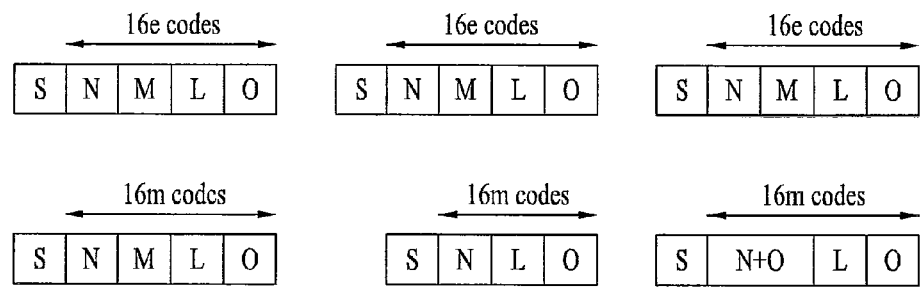
FIG. 36 is a diagram illustrating a reuse method of code information according to an embodiment of the present invention.

FIG. 36 is a diagram illustrating a reuse method of code information according to an embodiment of the present invention.

In this embodiment, respective codes of 16m ranging are equivalent to respective codes of 16e.

The number of codes in 16e ranging are transmitted through the UCD. 16m ranging is able to use the number of codes equivalent to those of 16e ranging. The 16m terminal can identify the number, i.e., S, N, M, O of codes for respective ranging types by reading the UCD from the 16e control channel. For 16m ranging, the 16m is able to use the number of codes equivalent to those of 16m ranging. This is illustrated in (a) of FIG. 36. Also, (b) of FIG. 36 and (c) of FIG. 36 illustrate different types of codes from each other. Referring to (b) of FIG. 36, four ranging codes exist in the 16e, whereas three ranging codes exist in the 16m. In this case, the number M of periodical ranging codes is not used in the 16m. In an example of (c) of FIG. 36, different kinds of 16e ranging codes are used together in the 16m ranging. Although the number N of initial ranging codes is different from the number O of handover ranging codes in case of the 16e ranging, N+O codes are allocated in the 16m without any identification of the two types of codes. In this case, since the number of ranging codes for the 16m may not be required for signaling, control signaling overhead can be reduced.

Figure 37:
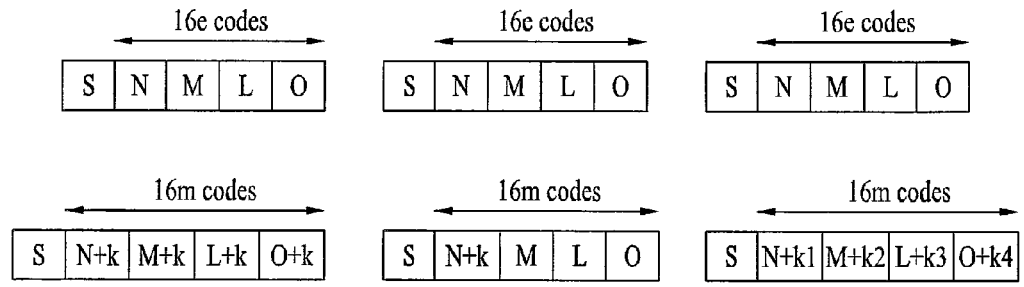
FIG. 37 is a diagram illustrating a reuse method of code information according to another embodiment of the present invention.

FIG. 37 is a diagram illustrating a reuse method of code information according to another embodiment of the present invention.

In this embodiment, a method of signaling a difference value between the number of codes of 16m ranging and the number of codes of 16e ranging will be described.

Even in case of the same ranging type, different types of codes can be used in accordance with structures and requirements of the 16e ranging and the 16m ranging. In this case, a scheme of signaling the difference (offset or difference value) only between the number of codes in the 16e and the number of codes in the 16m can be used. If a value corresponding to specific offset is signaled, the terminal can calculate a corresponding offset value by a method previously defined based on the signaled value. For example, if o is signaled as a value corresponding to offset, the terminal can identify an actual offset value k by calculation of k=a*o+b. In this case, a and b represent integers already known by the terminal and previously defined. This example is illustrated in FIG. 37. In an example illustrated in (a) of FIG. 37, the number of codes obtained by adding the number of codes equivalent to a specific value k to the number of 16e codes is used for 16m ranging. In this case, since signaling of only one code offset value is required in the 16m, control overhead can be reduced. In an example illustrated in (b) of FIG. 37, several codes equivalent to those of the 16e are used and several specific codes are additionally allocated in the 16m. In this case, a value corresponding to code types and offset may be signaled, or a value corresponding to offset of a code type which is previously defined may be signaled only. In an example illustrated in (c) of FIG. 37, a separate offset value is used for each code type.

In the aforementioned examples, signaling is performed for the value corresponding to offset. However, a fixed value which is previously defined may be used as the offset value, whereby operation can be performed without signaling.

In the aforementioned examples, the number of code types can include cyclic-shifted codes. For example, if the 16m performs cyclic shift by using Zadoff-Chu (ZC) code, a specific ZC root index can be used from the start (start of S or N) of all codes. Afterwards, the number of codes is filled with the cyclic-shifted codes in the root index. If the codes cyclic shifted in the root index are all used, other root index is used. For example, a root index physically or logically continuous from the aforementioned specific root index can be used to continue to use the cyclic shifted codes. At the interface between the respective codes, the cyclic shifted codes may be used continuously without partition of the interface, or the root index may be changed with another one at the interface between the respective codes.

Embodiment 5-2

Reuse Method of Location Information

Figure 38:
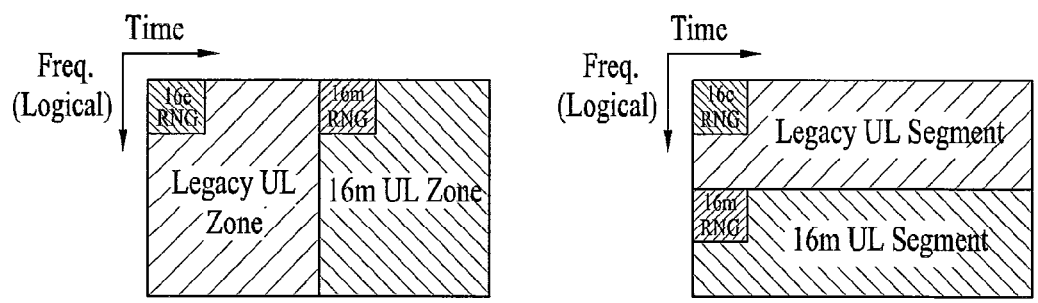
FIG. 38 is a diagram illustrating a reuse method of location information according to an embodiment of the present invention.

FIG. 38 is a diagram illustrating a reuse method of location information according to an embodiment of the present invention.

In this embodiment, the 16m ranging uses frequency/time start location relatively the same as that of the 16e ranging.

Figure 39:
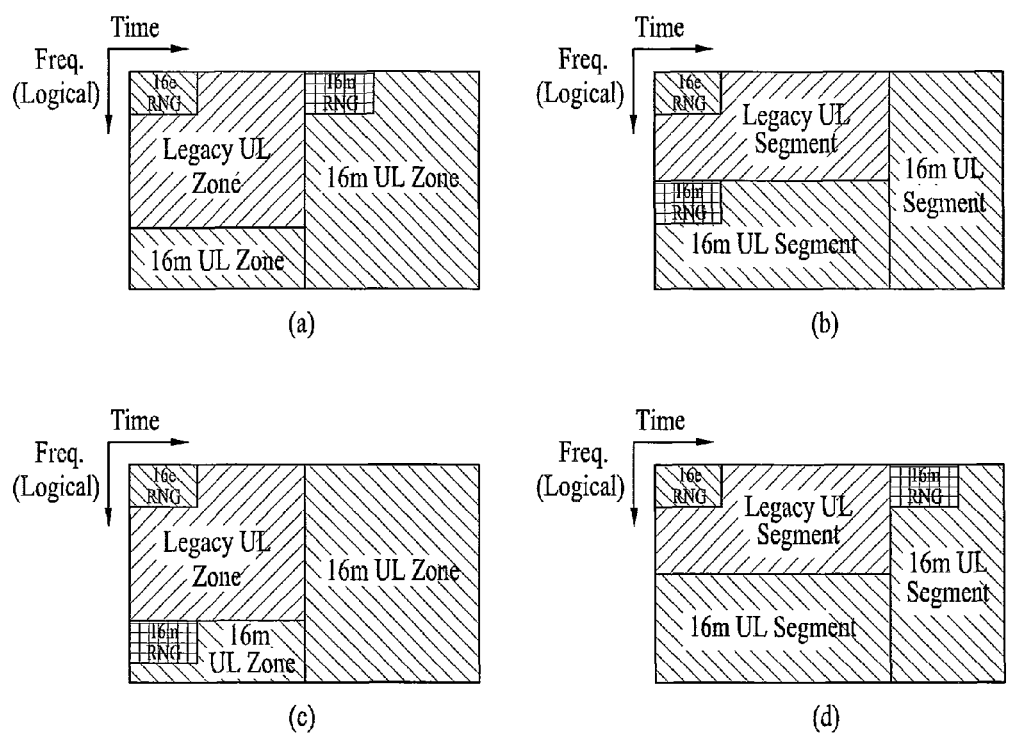
FIG. 39 is a diagram illustrating a reuse method of location information according to another embodiment of the present invention.

The 16m ranging can use the time/frequency location within the 16m region relatively corresponding to the time/frequency location within the 16e region of the 16e ranging, without additional control signaling. For example, in FIG. 38, the 16e ranging location starts from the fastest time domain and the lowest frequency domain at the 16e UL region. At this time, the location of the 16m ranging can be started from the time/frequency location within the 16m region corresponding to the location of the 16e ranging identified without additional control signaling. In this embodiment, since the location of the 16e ranging is started from the fastest time domain and the lowest frequency domain within the 16e UL region, the location of the 16m ranging is also started from the fastest time domain and the lowest frequency domain within the 16m UL region. (a) of FIG. 38 illustrates that TDM is used, and (b) of FIG. 38 illustrates that FDM is used. Also, (a) of FIG. 39 illustrates that the 16m ranging is located at the relative location within the 16m region multiplexed in accordance with TDM, and (b) of FIG. 39 illustrates that the 16m ranging is located at the relative location within the 16m region multiplexed in accordance with FDM. Unlike FIG. 39, (c) and (d) of FIG. 39 illustrate examples of multiplexing if the legacy region is relatively smaller than the 16m region. In this case, it may be regarded that the legacy region and the 16m region are multiplexed in TDM or FDM depending on aspects. In this case, the relative location of the 16m ranging can follow FDM or TDM. If a multiplexing mode for TDM or FDM is signaled, the relative location of the 16m ranging can be defined depending on the signaled multiplexing mode.

Figure 40:
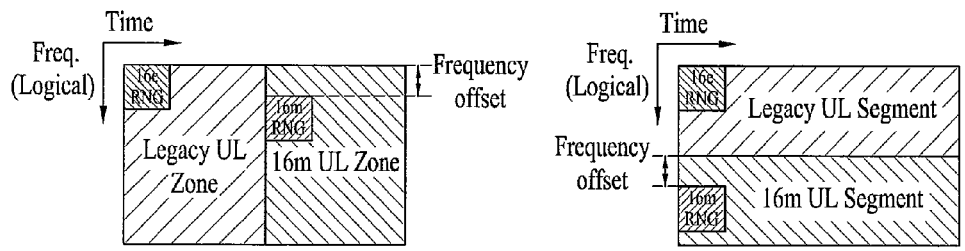
FIG. 40 to FIG. 42 are diagrams illustrating reuse methods of location information according to other embodiment of the present invention.
Figure 41:
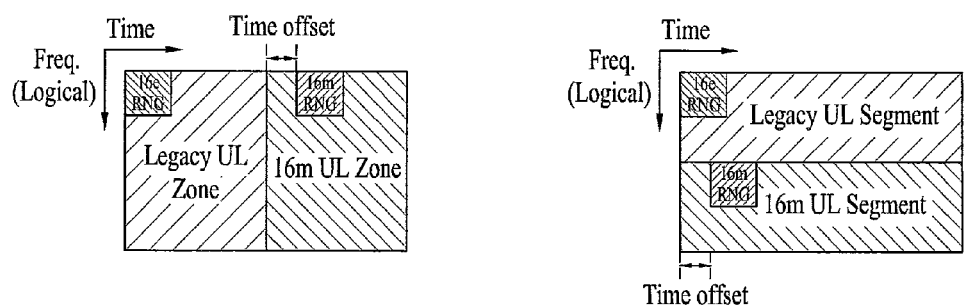
Figure 42:
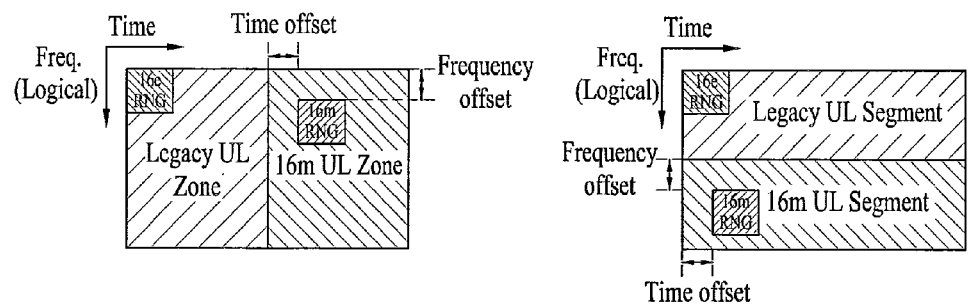

FIG. 40 to FIG. 42 are diagrams illustrating reuse methods of location information according to other embodiment of the present invention.

In this embodiment, offset or difference value between the frequency and/or time start location of the 16m ranging and the frequency and/or time start location of the 16e ranging is signaled.

In order to obtain flexibility for resource allocation of the 16m, a scheme for making the location of the 16m ranging be different from that of the 16e ranging. In this case, a scheme of signaling the difference (offset or difference value) only between the time and/or frequency location in the 16e and the time and/or frequency location in the 16m can be used. If a value corresponding to specific offset is signaled, the terminal can calculate a corresponding offset value by a method previously defined based on the signaled value. For example, if o is signaled as a value corresponding to offset, the terminal can identify an actual offset value k by calculation of k=a*o+b. In this case, a and b represent integers already known by the terminal and previously defined. This previously defined value can be defined in a unit of the frequency domain of UL resource allocation of the 16m. Likewise, the same method can be used even in case of offset for the time location. In this case, the previously defined value can be defined in a unit of the time domain for UL resource allocation of the 16m or a unit of UL scheduling. This example is illustrated in FIG. 40 and FIG. 41. FIG. 40 illustrates offset in the frequency domain, and FIG. 41 illustrates offset in the time domain. As illustrated in FIG. 42, the method of defining the location of the 16m ranging with both offset for the time location and offset for the frequency location relative with those of the 16e can be used. At this time, the offset for the time location may be equal to the offset for the frequency location. If the offset for the time location is equal to the offset for the frequency location, only one offset may be signaled to identify information on the location. In this case, TDM is used in (a) of FIG. 40, (a) of FIG. 41, and (a) of FIG. 42, TDM is used, whereas FDM is used in (b) of FIG. 40, (b) of FIG. 41, and (b) of FIG. 42.

Although the frequency domain is continuous in the aforementioned examples, it may be continuous or discontinuous. In other words, the present invention is not restricted by whether the ranging channel is arranged continuously or discontinuously in the frequency domain. In the aforementioned examples, the frequency corresponding to vertical label may be replaced with subchannel, resource block or resource unit.

Although the 16e ranging region and the 16m ranging region have one size in the aforementioned examples, the time and frequency sizes of the ranging region may be varied, and one or more ranging slots may be located in one ranging region. Also, although the location of the 16e ranging is fixed to the specific location in the time and frequency domains in the aforementioned examples, this is only exemplary. Actually, the start location of the 16m ranging relative to the 16e ranging can be applied depending on the start location of the 16e ranging. The present invention is not restricted by the location and size in the time and frequency domains of the 16e ranging. The relative time/frequency start location of the 16m ranging may only be defined from the 16e ranging, and the time/frequency size of the 16m ranging may be signaled separately. Also, in the aforementioned examples, signaling is performed for the value corresponding to offset. However, a fixed value which is previously defined may be used as the offset value, whereby operation can be performed without signaling.

Embodiment 5-3

Reuse Method of Information on the Number of Ranging Slots

Figure 43:
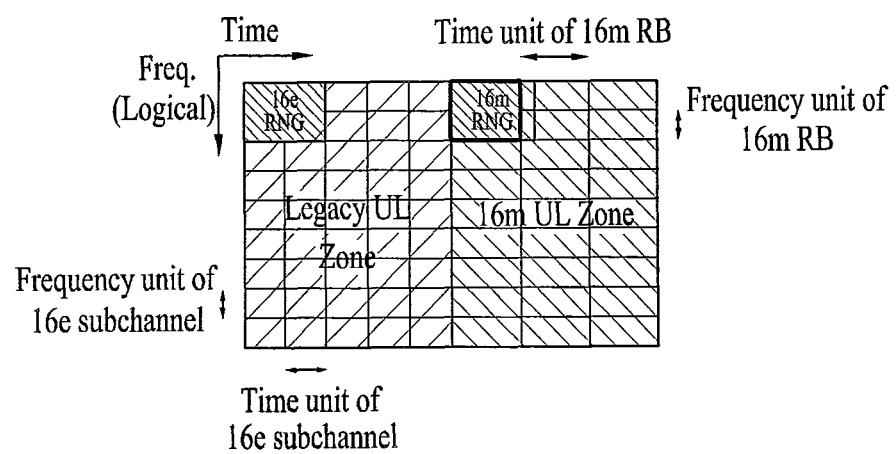
FIG. 43 and FIG. 44 are diagrams illustrating reuse methods of information on the number of ranging slots according to an embodiment of the present invention.
Figure 43:
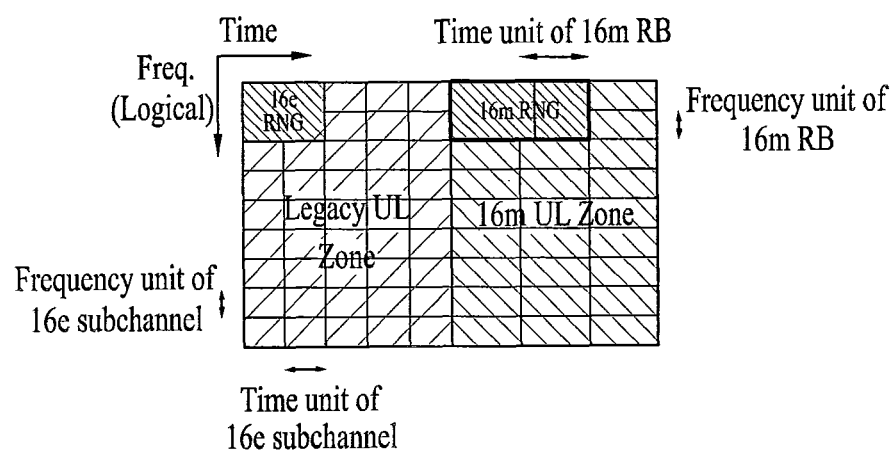

FIG. 43 is a diagram illustrating a reuse method of information on the number of ranging slots according to an embodiment of the present invention. In this embodiment, it is assumed that the 16m ranging uses the same number of slots as that of the 16e ranging.

In the aforementioned examples, the size of the time/frequency domain of the 16e ranging may not be a multiple of 16m UL resource allocation unit or UL scheduling unit. In this case, a method of allocating resources in accordance with a specific rule which is previously defined can be used. For example, as illustrated in (a) of FIG. 43, the number of symbols of the time domain in the 16m ranging is smaller than the number of OFDM symbols of the 16e ranging region but is defined by the maximum number of OFDM symbols corresponding to a multiple of 16m UL resource allocation unit or UL scheduling unit. On the other hand, as illustrated in (b) of FIG. 43, the number of symbols of the time domain in the 16m ranging is greater than the number of OFDM symbols of the 16e ranging region but is defined by the minimum number of OFDM symbols corresponding to a multiple of 16m UL resource allocation unit or UL scheduling unit.

The aforementioned method will be described as follows. In other words, it is assumed that the number of symbols included in the ranging channel of the 16e is $N_{symbol,legacy}$, the number of symbols included in the ranging channel of the 16m is $N_{symbol,16m}$, and the number of OFDMA symbols corresponding to 16M, UL resource block or resource unit or UL scheduling unit is $N_{RB,Time}$ (for example, 6 OFDMA symbols). In this case, the result obtained by the aforementioned method is the same as $N_{symbol,16m}$ that satisfies Equation 1 or Equation 2 below.

In the following Equations, the result value of operation $$\max_{k}[\ ]$$

represents a maximum value of a natural number k that satisfies a value in [ ]. Also, the result value of operation $$\min_{k}[\ ]$$

represents a minimum value of a natural number k that satisfies a value in [ ].

$$N_{symbol,16m} = \alpha \times N_{RB,Time} \times \max_{k}[\alpha \times N_{RB,Time} \times k \leq N_{symbol,legacy}] \quad \text{[Equation 1]}$$

$$N_{symbol,16m} = \alpha \times N_{RB,Time} \times \min_{k}[\alpha \times N_{RB,Time} \times k \geq N_{symbol,legacy}] \quad \text{[Equation 2]}$$

In this case, a represents a value previously defined by a reciprocal number (for example, 1, ½, ⅓, ¼, etc.) of a number smaller than $N_{RB,Time}$.

Figure 44:
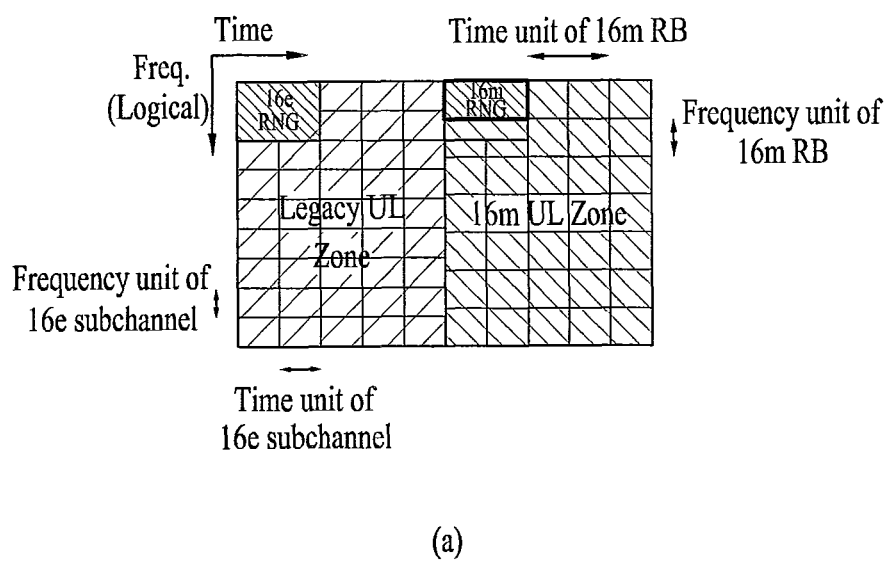
Figure 44:
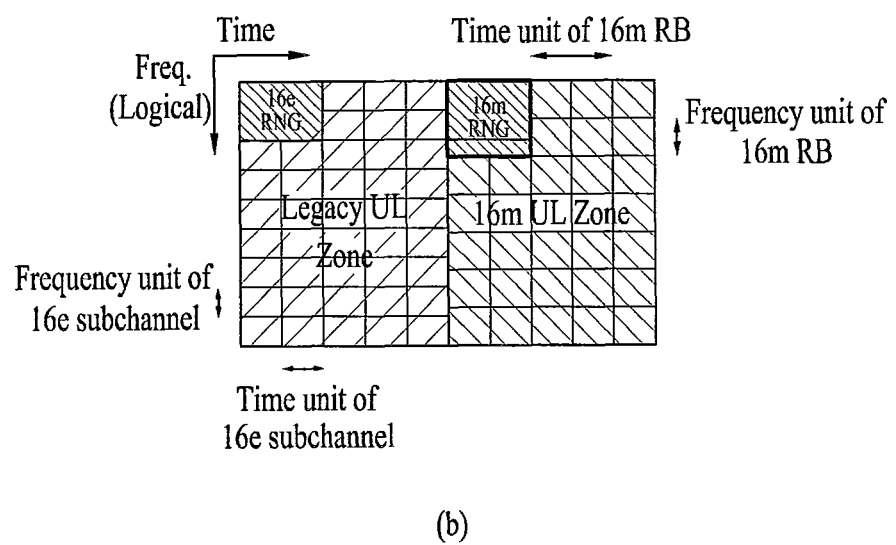

FIG. 44 is a diagram illustrating another reuse method of information on the number of ranging slots according to the embodiment of the present invention. In this embodiment, it is assumed that the 16m ranging structure uses the same number of subcarriers as that of the 16e ranging structure.

For example, as illustrated in (a) of FIG. 44, the number of subcarriers of the frequency domain in the 16m ranging is smaller than the number of subcarriers of the 16e ranging region but is defined by the maximum number of subcarriers corresponding to a multiple of 16m UL resource allocation unit or UL scheduling unit. On the other hand, as illustrated in (b) of FIG. 44, the number of subcarriers of the frequency domain in the 16m ranging is greater than the number of subcarriers of the 16e ranging region but is defined by the minimum number of subcarriers corresponding to a multiple of 16m UL resource allocation unit or UL scheduling unit.

The aforementioned method will be described as follows. In other words, it is assumed that the number of subcarriers included in the ranging channel of the 16e is $N_{sub\_c,legacy}$, the number of subcarriers included in the ranging channel of the 16m is $N_{sub\_c,16m}$, and the number of OFDMA subcarriers corresponding to 16M UL resource block or resource unit or UL scheduling unit is $N_{RB,Freq}$ (for example, 18 subcarriers). In this case, the result obtained by the aforementioned method is the same as $N_{sub\_c,16m}$ that satisfies Equation 3 or Equation 4 below.

$$N_{sub\_c,16m} = \alpha \times N_{RB,Freq} \times \max_{k}[\alpha \times N_{RB,Freq} \times k \leq N_{sub\_c,legacy}] \quad \text{[Equation 3]}$$

$$N_{sub\_c,16m} = \alpha \times N_{RB,Freq} \times \min_{k}[\alpha \times N_{RB,Freq} \times k \geq N_{sub\_c,legacy}] \quad \text{[Equation 4]}$$

In this case, a represents a value previously defined by a reciprocal number (for example, 1, ½, ⅓, ¼, etc.) of a number smaller than $N_{RB,Freq}$. In Equation 3 and Equation 4, it is assumed that the OFDMA symbol length of the 16e is the same as that of the 16m. If the OFDMA symbol length of the 16e is different from that of the 16m, Equations based on the different OFDMA symbol lengths can be used.

According to another method, the 16m terminal can calculate how many ranging slots are allocated to the 16e ranging region, so as to obtain the 16m ranging region to which the number of ranging slots the same as those allocated to the 16e ranging region is allocated. For example, the 16m terminal can calculate how many slots exist in the time and frequency domain of the 16e ranging region, and can allocate 16m ranging slots equivalent to the 16e ranging slots from the time and frequency domain. For another example, the 16m terminal can know the size of only one of the time or frequency domain of the 16m ranging region, and can allocate slots equivalent to the 16e ranging slots while increasing the other one of the time or frequency domain. The 16m terminal may allocate the region by calculating it. In this case, after giving priority to any one of time and frequency, if the 16m terminal increases or decreases the size of the 16m ranging region as compared with that of the 16e ranging region, it is preferable that the 16m terminal previously decides to first use any one of the time and frequency.

According to another embodiment of the present invention, a method of signaling offset or difference value between the number of ranging slots used in the 16m and the number of ranging slots used in the 16e can be used.

The 16m ranging may need allocation of slots different from those allocated for the 16e ranging due to the difference in structures and requirements of codes with the 16e ranging. In this case, a scheme of signaling the difference (offset or difference value) only between the number of ranging slots in the 16e and the number of ranging slots in the 16m can be used. If a value corresponding to specific offset is signaled, the terminal can calculate a corresponding offset value by a method previously defined based on the signaled value. For example, if o is signaled as a value corresponding to offset, the terminal can identify an actual offset value k by calculation of k=a*o+b. In this case, a and b represent integers already known by the terminal and previously defined. Afterwards, the 16m ranging region can be allocated by the aforementioned methods.

The reuse method of 16e ranging control information can be combined with codes, time/frequency location and the number of slots of the aforementioned 16m ranging. Specific information can be read from the 16e ranging control information without separate signaling, and the other information can be signaled.

In the aforementioned examples, it has been described that the 16m ranging is in the 16m region. However, even if the 16m ranging is allocated to the 16e region, it may not restrict application of the present invention. For example, if the 16m ranging is allocated to the 16e region and the time/frequency start location is reused, the 16m ranging can be started at the relative location next to the time or frequency domain where the 16e ranging ends, without additional signaling. In other words, for application of the present invention, the 16e region can be regarded as the 16m region from the time/frequency domain where the 16e ranging region ends.

For clarity, in the above description, the 16e ranging structure and the 16m ranging structure are separately explained. For example, in case that a plurality of 16e ranging slots exist, it is able to apply the embodiment of the present invention to each of the slots independently. Moreover, in case that a plurality of 16m ranging slots exist, it is able to apply the embodiment of the present invention to each of the slots independently.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparent that an embodiment can be configured by combining claims not in explicit citation relation or with new claims according to amendment after filing.

In this disclosure, embodiments of the present invention are described centering on the data transmission/reception relations between a base station and a terminal. In this disclosure, a specific operation explained as performed by a base station can be performed by an upper node of the base station in some cases. In particular, in a network constructed with a plurality of network nodes including a base station, various operations performed for communication with a terminal can be performed by a base station or other networks except the base station. 'Base station' can be replaced by such a terminology as a fixed station, a Node B, an eNode B (eNB), an access point and the like. And, 'terminal' can be replaced by such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs 9digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

Accordingly, the present invention is applicable to a method of performing communication in a wireless communication system. In particular, the present invention is applicable to a ranging structure supporting a legacy support mode in a wireless communication system and a multiplexing scheme thereon. In more particular, the present invention is applicable to a ranging structure and multiplexing scheme thereof in case of using IEEE 802.16e ranging structure and IEEE 802.16m ranging structure together.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of performing a ranging procedure at a terminal in a wireless communication system that supports a legacy scheme and a normal scheme, the method comprising:

selecting a specific ranging structure from a first ranging structure that supports the legacy scheme and a second ranging structure that supports the normal scheme based on probabilities; and transmitting a ranging signal through the specific ranging structure, wherein code resources for the first ranging structure are generated using a pseudo random noise code generation equation $1+X^1+X^4+X^7+X^{15}$, wherein code resources for the second ranging structure are generated using a pseudo random noise code generation equation $1+X^8+X^{11}+X^{14}+X^{15}$, wherein, for a normal communication, a probability for the first ranging structure is given as $P_{A1}$ ($0<P_{A1}<1$) and a probability for the second ranging structure is given as $P_{A2}$ ($P_{A1}+P_{A2}=1$) in consideration of a ranging load, wherein, for an emergency communication, the probability for the first ranging structure is given as $P_{B1}$ ($0<P_{B1}<1$) and the probability for the second ranging structure is $P_{B2}$ ($P_{B1}+P_{B2}=1$) such that $P_{B1}=(P_{A2}-\text{offset})$, $P_{B2}=(P_{A1}+\text{offset})$ and $P_{B1}<P_{B2}$, and wherein the offset is a positive real number.

2. The method of claim 1, wherein the specific ranging structure is selected randomly or based on a predetermined reference.

3. The method of claim 2, wherein the predetermined reference includes a probability value, terminal capability, terminal status, or their combination.

4. The method of claim 1, further comprising receiving legacy information for setting the second ranging structure, wherein at least a part of the legacy information is common information and is reused as information for setting the first ranging structure.

5. The method of claim 4, wherein the common information includes information on the number of legacy codes used to set the second ranging structure.

6. The method of claim 5, wherein the number of normal codes used for the first ranging structure is set using the number of legacy codes and offset.

7. The method of claim 4, wherein the common information includes information on legacy time-frequency resources for the second ranging structure, and the first ranging structure is set at the relatively same location as the legacy time-frequency resources or at the location away from the legacy time-frequency resources as much as offset within a time-frequency domain allocated to the normal scheme.

8. The method of claim 4, wherein the common information includes information on total bandwidths of time-frequency resources for the second ranging structure and total subcarriers corresponding to the bandwidths.

9. The method of claim 4, wherein the common information includes information on a total length of a time domain of time-frequency resources for the second ranging structure and the number of total OFDMA (Orthogonal Frequency Division Multiple Access) symbols corresponding to the total length.

10. The method of claim 4, wherein the common information includes information on the number of legacy slots used for the second ranging structure, and the number of normal slots used for the first ranging structure is defined using the number of legacy slots and offset.

11. A terminal configured to perform a ranging procedure in a wireless communication system that supports a legacy scheme and a normal scheme, the terminal comprising:

a processor configured to select a specific ranging structure from a first ranging structure that supports the legacy scheme and a second ranging structure that supports the normal scheme based on probabilities, and transmit a ranging signal through the specific ranging structure, wherein code resources for the first ranging structure are generated using a pseudo random noise code generation equation $1+X^1+X^4+X^7+X^{15}$, wherein code resources for the second ranging structure are generated using a pseudo random noise code generation equation $1+X^8+X^{11}+X^{14}+X^{15}$, wherein, for a normal communication, a probability for the first ranging structure is given as $P_{A1}$ ($0<P_{A1}<1$) and a probability for the second ranging structure is given as $P_{A2}$ ($P_{A1}+P_{A2}=1$) in consideration of a ranging load, wherein, for an emergency communication, the probability for the first ranging structure is given as $P_{B1}$ ($0<P_{B1}<1$) and the probability for the second ranging structure is $P_{B2}$ ($P_{B1}+P_{B2}=1$) such that $P_{B1}=(P_{A2}-\text{offset})$, $P_{B2}=(P_{A1}+\text{offset})$ and $P_{B1}<P_{B2}$, and wherein the offset is a positive real number.

* * * * *